(12) United States Patent
Weldon et al.

(10) Patent No.: US 10,918,214 B2
(45) Date of Patent: Feb. 16, 2021

(54) MULTIFUNCTIONAL FOLDING CHAIR APPARATUS AND SYSTEM

(71) Applicant: OME Gear Co., LLC, Mt. Pleasant, SC (US)

(72) Inventors: Julie Weldon, Mt. Pleasant, SC (US); Stacey Pierce, Mt. Pleasant, SC (US); Robert Evans, Greer, SC (US); Lynn Weirick, Greenville, SC (US); Jaclyn Lynch, Greenville, SC (US); Shawn Quinn, Waterford, MI (US); Alex Grube, Roseville, MI (US)

(73) Assignee: OME Gear Co., Mt. Pleasant, SC (US)

( * ) Notice: Subject to any disclaimer, the term of this patent is extended or adjusted under 35 U.S.C. 154(b) by 0 days.

(21) Appl. No.: 16/714,733

(22) Filed: Dec. 14, 2019

(65) Prior Publication Data

US 2020/0107642 A1 Apr. 9, 2020

Related U.S. Application Data

(63) Continuation-in-part of application No. 16/020,311, filed on Jun. 27, 2018, now Pat. No. 10,716,404.
(Continued)

(51) Int. Cl.
*A47C 13/00* (2006.01)
*B62B 1/12* (2006.01)
*A47C 7/00* (2006.01)

(52) U.S. Cl.
CPC .............. *A47C 13/00* (2013.01); *A47C 7/006* (2013.01); *B62B 1/12* (2013.01)

(58) Field of Classification Search
CPC .......... A47C 13/00; A47C 1/14; A47C 1/143; A47C 4/04; A47C 4/08; A47C 4/28;
(Continued)

(56) References Cited

U.S. PATENT DOCUMENTS

| 5,423,592 | A | * | 6/1995 | Spurrier | ................. | A47C 1/143 |
| | | | | | | 297/129 |
| 6,079,777 | A | | 6/2000 | Simmons et al. | | |

(Continued)

FOREIGN PATENT DOCUMENTS

| CN | 204500048 U | 7/2015 |
| CN | 206238857 U | 6/2017 |

(Continued)

*Primary Examiner* — John D Walters
(74) *Attorney, Agent, or Firm* — Gregory Finch; Finch Paolino, LLC

(57) ABSTRACT

A multifunctional folding chair and wheeled cart system and kit includes a multifunctional folding chair that easily convert into a fully unfolded configuration of a flat bed, a partially folded configuration of a reclining lounger, an upright lounger, a short beach chair, and a regular chair, and a fully folded configuration. The system also includes at least one multifunctional wheeled chair that includes, in addition to the configurations of the multifunctional folding chairs, a partially folded configuration of a wheeled cart. The multifunctional wheeled chair, in the wheeled cart configuration, is configured to hold and transport the plurality of multifunctional folding chairs in the folded configuration.

18 Claims, 20 Drawing Sheets

Related U.S. Application Data

(60) Provisional application No. 62/842,991, filed on May 3, 2019.

(58) Field of Classification Search
CPC ......... A47C 7/006; A47C 7/008; B62B 1/008; B62B 1/10; B62B 1/12; B62B 1/042; B62B 1/04; B62B 5/06
USPC ...................................................... 280/47.18
See application file for complete search history.

(56) References Cited

U.S. PATENT DOCUMENTS

| | | | |
|---|---|---|---|
| 6,131,925 A * | 10/2000 | Weldon | B62B 1/12 |
| | | | 280/30 |
| 6,312,048 B1 | 11/2001 | Kilmer | |
| 8,297,642 B2 | 10/2012 | Tyson, III | |
| 8,585,135 B2 | 11/2013 | Wilson | |
| 8,608,188 B2 * | 12/2013 | Goldszer | B62B 1/12 |
| | | | 280/651 |
| 8,967,651 B1 | 3/2015 | Simic | |
| 9,598,095 B2 * | 3/2017 | Panigot | B62B 1/208 |
| 2002/0088829 A1 * | 7/2002 | Hsu | B62B 5/0023 |
| | | | 224/153 |
| 2018/0000252 A1 | 1/2018 | Weldon et al. | |

FOREIGN PATENT DOCUMENTS

| | | |
|---|---|---|
| EP | 0550940 A1 | 7/1993 |
| EP | 0997090 A1 | 5/2000 |
| FR | 2612754 A1 | 9/1988 |
| FR | 3021853 B1 | 5/2017 |

\* cited by examiner

MULTIFUNCTIONAL FOLDING CHAIR APPARATUS AND SYSTEM

CROSS-REFERENCE TO RELATED APPLICATIONS

This application is a continuation-in-part of U.S. patent application Ser. No. 16/020,311, filed Jun. 27, 2018, and claims the benefit of U.S. Provisional Patent Application Ser. No. 62/842,991, filed May 3, 2019, and priority to International Application No. PCT/US19/39316 filed Jun. 26, 2019, the contents of each of which earlier-filed applications are hereby incorporated by reference herein in their entireties.

FIELD

The present disclosure relates to the field of outdoor chairs and carts; in particular, a multifunctional chair and cart apparatus embodying multiple separate and useful configurations. Even more specifically, the present disclosure relates to a folding chair and wheeled transportation system.

BACKGROUND

Outdoor activities have become increasingly popular and many of these activities take the form of picnics or days at the beach. On these outings, seating equipment such as chairs or loungers are typically not supplied. Therefore, it is usually necessary to bring personal folding chairs and loungers to the site. In addition to chairs, it is also frequently necessary to transport various other items, such as coolers, blankets, umbrellas, surfboards, tents, grills, cooking equipment, and the like from a vehicle to the site, such as a campground, picnic area, or the beach. The carrying of the various items including the portable seating and lounge devices may require several people or several trips between the car and the beach. Some of the items, such as a cooler full of beverages and ice, can be of considerable weight and can be stressful as well as hazardous for an individual to tote for a long distance. Commonly available foldable chairs and beach loungers are commonly available made out of lightweight aluminum tubular frames having a fabric covering which can be folded for storage or for transportation to an outing location. It has also been suggested to provide foldable chairs and lounges with wheels so that they can be rolled to different locations. These wheeled chairs or lounges can be used for carrying a cooler or other item(s) thereon.

An example of a typical wheeled foldable chair is described in U.S. Pat. No. 4,733,905 as a combination chair and cart. A two-wheeled vehicle is made to collapse into a retracted position and converts between a two wheeled cart and a chair. It allows one portion of the frame to be used for a handle when used as a cart. U.S. Pat. No. 5,492,347 describes a wheeled chair which can be mobilized by attaching a pair of wheels mounted to an axle to the legs of the chair and then using the chair back for a handle. U.S. Pat. No. 4,362,308 describes a combination portable chair and container which has a single roller assembly for rolling the chair and container thereon. The chair converts to a rolling container with sides that can be folded into a compact position for storage.

Wheeled chaise lounges are disclosed in U.S. Pat. No. 4,376,547, which describes a lounge chair assembly made convertible by a wheel assembly which clamps onto the lounge chair frame. U.S. Pat. No. 4,659,142 provides for a combination beach caddie and beach chair which has a single roller assembly attached to the frame of a chair in such a manner that a portion of the frame can be used for a handle for pushing the beach chair on the roller. U.S. Pat. No. 6,079,777 describes a combination chaise lounge and tote cart. U.S. Pat. No. 5,040,807 describes a combination beach chair and wheelbarrow apparatus which has a single wheel connected to the frame of a beach chair and also allows the frame of the beach chair to act as a handle for pushing the beach chair on the wheel when used as a wheelbarrow. U.S. Pat. No. 5,056,804 provides for a folding lounge chair and cart which has a pair of wheels attached to the frame of a folding lounge chair and allows the lounge chair to be extended in a straight position and, when turned over to act as a hand truck. Additionally, described in U.S. Pat. No. 3,693,993 is a convertible beach tote cart which uses a single roller on one end of the framework while the other end of the framework of the lounge chair can be used as a handle to push the tote cart.

Examples of folding chairs or folding lounges that have also been wheeled for a combination of utilities include those described in: U.S. Pat. No. 5,364,112, which teaches a wheel assembly for a combination folding chair and cart; U.S. Pat. No. 4,521,054, which teaches a chaise lounge; U.S. Pat. No. 5,056,804, which teaches a folding lounge chair and cart, and U.S. Pat. No. 5,423,592, which teaches a combination folding lounge chair and wagon. Furthermore, U.S. Pat. No. 4,645,262 describes a camp chair that converts to a hand truck. Additional disclosures relating to beach carts can be found in U.S. Pat. No. 4,316,615 and U.S. Design Pat. No. D367,347.

Through applied effort, ingenuity, and innovation, Applicant has identified a number of deficiencies and problems with prior outdoor chairs and carts. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a multifunctional chair apparatus comprising a first frame assembly comprising a first pair of parallel frame members and a first horizontal frame member extending between the first pair of parallel frame members; a second frame assembly comprising a second pair of parallel frame members and a second horizontal frame member extending between the second pair of parallel frame members; a hinge assembly being configured to rotatably engage from a closed position to an open position, the first pair of parallel frame members being coupled to a first end of the hinge assembly and the second pair of parallel frame members being coupled to a second end of the hinge assembly, the first frame assembly and the second frame assembly being rotatably coupled along an axis to define a first orientation and a second orientation, wherein the first orientation defines the first frame assembly as a chair seat and the second frame assembly as a chair back, and the second orientation defines the first frame assembly as the chair back and the second frame assembly as the chair seat; at least one support leg being rotatably coupled to the first frame assembly and configured to provide load support to the first frame assembly in the first orientation; and, a support assembly comprising a first elongated arm and a second elongated arm and a pair of stabilizers, wherein a first stabilizer in the pair of stabilizers is coupled to a distal end of the first elongated arm and a second stabilizer in the pair of stabilizers is coupled to a distal end of the second elongated arm, the first elongated arm and the second elongated arm being coupled to the first frame assembly and extending from the first pair of parallel frame members such that the support assembly is configured to provide load support to the first frame assembly in the first orientation and provide load support to the second frame assembly in the second orientation.

Certain embodiments of the multifunctional chair apparatus may further comprise a third frame assembly comprising a third pair of parallel frame members and a third horizontal frame member extending between the third pair of parallel frame members, the third frame assembly being rotatably coupled to the first frame assembly. Certain embodiments of the multifunctional chair apparatus may further comprise a fourth frame assembly comprising a fourth pair of parallel frame members and a fourth horizontal frame member extending between the fourth pair of parallel frame members, the fourth frame assembly being rotatably coupled to the second frame assembly.

Certain embodiments of the present disclosure include a multifunctional chair apparatus wherein the hinge assembly is configured to be selectively locked at angles of about 0 degrees, about 100 degrees, about 140 degrees, and about 180 degrees.

Certain embodiments of the multifunctional chair apparatus may further comprise a pair of arm rests being removably coupled to the first frame assembly in the first orientation and being removably coupled to the second frame assembly in the second orientation.

Certain embodiments of the multifunctional chair apparatus may further comprise a second hinge assembly being coupled to the first frame portion and the third frame portion.

Certain embodiments of the multifunctional chair apparatus may further comprise a third hinge assembly being coupled to the second frame assembly and the fourth frame assembly.

Certain embodiments of the present disclosure include a multifunctional chair apparatus wherein the support assembly defines a first seat height in the first orientation and a second seat height in the second orientation.

Certain aspects of the present disclosure provide for a multifunctional chair system comprising, a first chair comprising: a frame assembly comprising a first frame portion and a second frame portion; a wheel assembly being coupled to the frame assembly, the wheel assembly comprising a pair of elongated support arms and a pair of wheels, the wheel assembly being configured to define a first seat height of the frame assembly when configured in a first configuration and define a second seat height of the frame assembly when configured in a second configuration; and, a hinge assembly comprising at least one lockable hinge, the hinge assembly being coupled to the frame assembly and being configured to selectively position the first frame portion and the second frame portion between a folded position, a seated position, a reclined position, and a flat position; and a second chair being configured between a folded configuration and a seated configuration, the second chair being removably coupled to the frame assembly of the first chair when in the folded configuration.

Certain embodiments of the present disclosure include a multifunctional chair system wherein the first frame portion, the second frame portion, and the wheel assembly are selectively configured to define a cart. In accordance with certain embodiments, the multifunctional chair system may be configured wherein the second chair is removably coupled to the frame assembly of the first chair when the first chair is configured to define the cart.

Certain embodiments of the multifunctional chair apparatus may further comprise at least one support leg coupled to the frame assembly, the at least one support leg being configured to pivot between an engaged position and a disengaged position.

Certain embodiments of the present disclosure include a multifunctional chair system wherein the second chair comprises a support assembly comprising a first elongated arm and a second elongated arm and a pair of stabilizers, wherein a first stabilizer in the pair of stabilizers is coupled to a distal end of the first elongated arm and a second stabilizer in the pair of stabilizers is coupled to a distal end of the second elongated arm.

Certain embodiments of the present disclosure include a multifunctional chair system wherein the second frame portion comprises a first frame section and a second frame section being pivotably coupled by a first hinge and a second hinge.

Still further aspects of the present disclosure provide for a multifunctional chair kit comprising a first chair comprising a frame assembly comprising a first frame portion and a second frame portion; a wheel assembly being coupled to the frame assembly, the wheel assembly comprising a pair of elongated support arms and a pair of wheels, the wheel assembly being configured to define a first seat height of the frame assembly when configured in a first configuration and define a second seat height of the frame assembly when configured in a second configuration; and, a hinge assembly comprising at least one lockable hinge, the hinge assembly being coupled to the frame assembly and being configured to selectively position the first frame portion and the second frame portion between a folded position, a seated position, a reclined position, and a flat position; and, a second chair comprising a frame assembly comprising a first frame portion and a second frame portion; a support assembly being coupled to the frame assembly, the support assembly comprising a first elongated arm and a second elongated arm and a pair of stabilizers, wherein a first stabilizer in the pair of stabilizers is coupled to a distal end of the first elongated arm and a second stabilizer in the pair of stabilizers is coupled to a distal end of the second elongated arm, the support assembly being configured to define a first seat height of the frame assembly when configured in a first configuration and define a second seat height of the frame assembly when configured in a second configuration; and, a hinge assembly comprising at least one lockable hinge, the hinge assembly being coupled to the frame assembly and being configured to selectively position the first frame portion and the second frame portion between a folded position, a seated position, a reclined position, and a flat position.

Certain embodiments of the present disclosure include a multifunctional chair kit wherein the second chair is removably coupled to the frame assembly of the first chair; and may further include a multifunctional chair kit wherein the first chair is selectively configured as a cart.

Certain embodiments of the present disclosure include a multifunctional chair kit wherein the first chair further comprises a pair of arm rests being removably coupled to the first frame portion in the first orientation and being removably coupled to the second frame portion in the second orientation.

Certain embodiments of the present disclosure include a multifunctional chair kit wherein the at least one lockable hinge of the first chair and the second chair is configured to selectively lock at angles of about 0 degrees, about 100 degrees, about 140 degrees, and about 180 degrees.

Certain embodiments of the present disclosure include a multifunctional chair kit wherein the first chair further comprises at least one support leg coupled to the frame assembly, the at least one support leg being configured to pivot between an engaged position and a disengaged position.

In certain embodiments, provided is a multifunctional chair apparatus comprising: an elongated rectangular main frame comprised of a plurality of interconnected frame members, the interconnected frame members forming a primary frame assembly and a secondary frame assembly within the elongated rectangular main frame; a central hinge assembly rotatably coupled to the elongated rectangular main frame at a substantially central portion thereof, the central hinge assembly comprising: a first hinge and a second hinge coupled to opposite parallel sides of the elongated rectangular main frame and rotatably interconnecting lateral frame members forming the primary frame assembly with lateral frame members forming the secondary frame assembly; and a central transverse rod connected to the first hinge and the second hinge and defining a central folding portion of the main frame between the primary frame assembly and the secondary frame assembly; a wheel assembly comprising: a pair of elongated arms pivotably coupled to and extending laterally from opposite parallel sides of the main frame; a wheel axle rod transversely disposed between the pair of elongated arms in a direction perpendicular to a direction of elongation of the main frame; a pair of wheels coupled to opposite ends of the wheel axle rod at exterior surfaces of the elongated arms; and at least one support leg pivotably coupled to the secondary assembly of the main frame so as to provide load support to the secondary frame assembly in configurations of the multifunctional chair apparatus where the secondary frame assembly is configured as a base portion and the primary frame assembly is configured as a back portion. In embodiments, multifunctional chair apparatus, further comprises a first subframe coupled to the primary frame assembly by pivoting joints so as to extend over and in parallel with a frame member defining a first end portion of the main frame, and a second subframe coupled to the secondary frame assembly by pivoting joints so as to extend over and in parallel with a frame member defining a second end portion of the main frame. The central hinge assembly according to embodiments of the invention is configured to be selectively locked at angles of 0 degrees, 100 degrees, 140 degrees, and 180 degrees.

In an alternative embodiment, multifunctional chairs of the invention may comprise a stabilizer support assembly instead of the wheel support assembly pivotably coupled to the main frame. A stabilizer support assembly according to such embodiments comprises: a pair of elongated arms pivotably coupled to and extending laterally from opposite parallel sides of the main frame; a stabilizer rod transversely disposed between the pair of elongated arms in a direction perpendicular to a direction of elongation of the main frame; and a pair of stabilizers coupled to opposite ends of the stabilizer at exterior surfaces of the elongated arms. Stabilizers according to embodiments of the invention may preferably have a rounded "pie slice" or circular vector configuration, wherein the rounded side of the circular vector-shaped stabilizer forms the bottom support portion and the peak forms the point of attachment to the elongated arms.

In certain embodiments, the primary frame assembly and the secondary frame assembly are each comprised of a proximal frame and a distal frame, the proximal frames being located on opposite sides of the central transverse rod and rotatably connected by the central hinge assembly; the primary frame assembly comprises a primary hinge assembly at a substantially central portion thereof, the primary hinge assembly comprising: a first hinge and a second hinge coupled to opposite parallel frame members defining the primary frame assembly and rotatably interconnecting lateral frame members forming the proximal frame with lateral frame members forming the distal frame, and a primary transverse rod connected to the first hinge and the second hinge of the primary frame assembly, the primary transverse rod defining a central folding portion of the primary frame assembly between the proximal frame and the distal frame; and the secondary frame assembly comprises a secondary hinge assembly at a substantially central portion thereof, the secondary hinge assembly comprising: a first hinge and a second hinge coupled to opposite parallel frame members of the secondary frame assembly and rotatably interconnecting lateral frame members forming the proximal frame with lateral frame members forming the distal frame, and a secondary transverse rod connected to the first hinge and the second hinge of the secondary frame assembly, the secondary transverse rod defining a central folding portion of the secondary frame assembly between the proximal frame and the distal frame.

According to additional embodiments, a multifunctional chair apparatus of the invention comprises: a main frame of a metal frame members, the main frame comprising a primary frame assembly and a secondary frame assembly; a hinge assembly comprising at least one lockable hinge rotatably connecting the primary frame assembly and the secondary frame assembly; and a wheel support assembly pivotably coupled to the main frame and comprising a pair of elongated arms, the wheel support assembly being configured to define a first height of a base portion of the multifunctional chair apparatus in configurations where the primary frame assembly and the secondary frame assembly have the first orientation, and to define a second height of the base portion of the multifunctional chair apparatus in configurations where the primary frame assembly and the secondary frame assembly have the second orientation, wherein in the first orientation, the primary frame assembly is configured as the base portion and the secondary frame assembly is configured as the back portion, and wherein in the second orientation, the primary frame assembly is configured as the back portion and the secondary frame assembly is configured as the base portion.

In an alternative embodiment of the invention, the multifunctional chair apparatus comprises a stabilizer support assembly instead of the wheel support assembly. Specifically, multifunctional chairs of the invention may comprise a stabilizer support assembly pivotably coupled to the main frame and comprising a pair of elongated arms, the stabilizer support assembly being configured to define a first height of a base portion of the multifunctional chair apparatus in configurations where the primary frame assembly and the secondary frame assembly have the first orientation, and to define a second height of the base portion of the multifunctional chair apparatus in configurations where the primary frame assembly and the secondary frame assembly have the second orientation, wherein in the first orientation, the primary frame assembly is configured as the base portion and the secondary frame assembly is configured as the back portion, and wherein in the second orientation, the primary frame assembly is configured as the back portion and the secondary frame assembly is configured as the base portion.

The multifunctional chair apparatus of the invention, wherein the wheel frame assembly defines a first height of the base portion in configurations of the multifunctional chair apparatus where the primary frame assembly is configured as the base portion and the secondary frame assembly is configured as the back portion; and a second height of the base portion in configurations of the multifunctional chair apparatus where the secondary frame assembly is configured as the base portion and the primary frame assembly is configured as the back portion.

In embodiments, the at least one lockable hinge is configured to selectively lock at angles of about 0 degrees, about 100 degrees, about 140 degrees, and about 180 degrees. In still other embodiments, the multifunctional chair apparatus may comprise at least one support leg pivotably coupled to the main frame.

The multifunctional chair apparatus further comprises a pair of arm rests removably coupled to opposite lateral frame members of the proximal frame of the primary frame assembly in configurations of the multifunctional chair apparatus where the primary frame assembly is configured as the base portion and the secondary frame assembly is configured as the back portion, and to opposite lateral frame members of the proximal frame of the secondary frame assembly in configurations of the multifunctional chair apparatus where the secondary frame assembly is configured as the base portion and the primary frame assembly is configured as the back portion.

According to a further object of the invention, provided is a multifunctional folding and wheeling chair system. The system according to embodiments of the invention comprises: plurality of multifunctional folding chairs, wherein each of the plurality of multifunctional folding chairs comprises: an elongated main frame comprised of a plurality of rotatably connected frame members forming a primary frame assembly and a secondary frame assembly of substantially equal size within the substantially elongated main frame; a central hinge assembly rotatably coupled to the elongated main frame at a substantially central portion thereof and configured to selectively rotate the primary frame assembly and the secondary frame assembly between a first orientation and a second orientation, the central hinge assembly comprising: a first hinge and a second hinge coupled to opposite parallel sides of the elongated lateral frame and rotatably coupling frame members of the primary frame assembly and the secondary frame assembly; and a central transverse rod connected to the to the first hinge and the second hinge and defining a central folding portion of the main frame between the primary frame assembly and the secondary frame assembly; a stabilizer support assembly comprising: a pair of elongated arms pivotably coupled and extending laterally from opposite parallel sides of the main frame; a stabilizer rod transversely disposed between the pair of elongated arms in a direction perpendicular to a direction of elongation of the main frame; and a pair of stabilizers coupled to opposite ends of the stabilizer rod at exterior surfaces of the elongated arms; wherein the support assembly is configured to define a first height of a base portion of the multifunctional chair apparatus in configurations where the primary frame assembly and the secondary frame assembly have the first orientation, and to define a second height of the base portion of the multifunctional chair apparatus in configurations where the primary frame assembly and the secondary frame assembly have the second orientation, wherein in the first orientation, the primary frame assembly is configured as the base portion and the secondary frame assembly is configured as the back portion, and wherein in the second orientation, the primary frame assembly is configured as the back portion and the secondary frame assembly is configured as the base portion.

The aforementioned system according to embodiments of the invention further comprises: at least one multifunctional folding wheeled chair, wherein each of the plurality of multifunctional folding wheeled chairs comprises: an elongated main frame comprised of a plurality of rotatably connected frame members forming a primary frame assembly and a secondary frame assembly of substantially equal size within the substantially elongated main frame; a central hinge assembly rotatably coupled to the elongated main frame at a substantially central portion thereof and configured to selectively rotate the primary frame assembly and the secondary frame assembly between a first orientation and a second orientation, the central hinge assembly comprising: a first hinge and a second hinge coupled to opposite parallel sides of the elongated lateral frame and rotatably coupling frame members of the primary frame assembly and the secondary frame assembly; and a central transverse rod connected to the to the first hinge and the second hinge and defining a central folding portion of the main frame between the primary frame assembly and the secondary frame assembly; a wheel support assembly comprising: a pair of elongated arms pivotably coupled and extending laterally from opposite parallel sides of the main frame; a wheel axle rod transversely disposed between the pair of elongated arms in a direction perpendicular to a direction of elongation of the main frame; and a pair of wheels coupled to opposite ends of the wheel axle rod at exterior surfaces of the elongated arms; wherein the support assembly is configured to define a first height of a base portion of the multifunctional chair apparatus in configurations where the primary frame assembly and the secondary frame assembly have the first orientation, and to define a second height of the base portion of the multifunctional chair apparatus in configurations where the primary frame assembly and the secondary frame assembly have the second orientation, wherein in the first orientation, the primary frame assembly is configured as the base portion and the secondary frame assembly is configured as the back portion, and wherein in the second orientation, the primary frame assembly is configured as the back portion and the secondary frame assembly is configured as the base portion. In the system of the invention, the at least one multifunctional folding wheeled chair, in the wheeled cart configuration, is configured to hold the plurality of multifunctional folding chairs in the fully folded configurations. Specifically, the multifunctional folding wheeled chair in the wheeled cart configuration is configured to hold two or more of the of the plurality of multifunctional folding chairs in the fully folded configuration. In certain embodiments, at least three multifunctional folding chairs in their fully folded configuration are suitably and conveniently stacked on the base portion of the multifunctional folding wheeled chair in the wheeled cart configuration.

Embodiments of invention prove for multifunctional chairs comprising a wheel support assembly together with multifunctional chairs comprising a stabilizer support assembly. Each of the multifunctional folding wheeled chairs has: an unfolded configuration of a flat bed; a partially folded configuration of a reclined lounger, an upright lounger, a short beach chair, an upright chair, and a wheeled cart; and a fully folded configuration. Each of the multifunctional folding chairs have: an unfolded configuration of a flat bed; a partially folded configuration of a reclined lounger, an upright lounger, a short beach chair, and an upright chair; and a fully folded configuration.

According to yet another object of the invention, provided is a multifunctional chair and wheeled cart kit. A kit according to embodiments of the invention comprises: a plurality of multifunctional folding chairs, each of the plurality of multifunctional folding chairs comprising: an elongated main frame comprised of a plurality of rotatably connected frame members forming a primary frame assembly and a secondary frame assembly of substantially equal size within the elongated main frame; a central hinge assembly rotatably coupled to the elongated main frame at a substantially central portion thereof and configured to selectively rotate the primary frame assembly and the secondary frame assembly between a first orientation and a second orientation, the central hinge assembly comprising: a first hinge and a second hinge coupled to opposite parallel sides of the elongated lateral frame and rotatably coupling frame members of the primary frame assembly and the secondary frame assembly; and a central transverse rod connected to the to the first hinge and the second hinge and defining a central folding portion of the main frame between the primary frame assembly and the secondary frame assembly; a support assembly comprising a pair of elongated arms pivotably coupled and extending laterally from opposite parallel sides of the main frame, the support assembly being configured to define a first height of a base portion of the multifunctional chair apparatus in configurations where the primary frame assembly and the secondary frame assembly have the first orientation, and to define a second height of the base portion of the multifunctional chair apparatus in configurations where the primary frame assembly and the secondary frame assembly have the second orientation, wherein in the first orientation, the primary frame assembly is configured as the base portion and the secondary frame assembly is configured as the back portion, and wherein in the second orientation, the primary frame assembly is configured as the back portion and the secondary frame assembly is configured as the base portion; and at least one of the plurality of multifunctional being a wheeled chair, wherein the at least one wheeled chairs further comprises, as part of the support assembly, a pair of wheels attached at opposite ends of a transverse wheel axle rod, and wherein the at least one wheeled chair is foldable into a configuration of a wheeled cart, the wheeled cart being configured to hold the plurality of multifunctional chairs in fully folded configurations. According to embodiments, the plurality of multifunctional chairs comprise, as part of the support assembly, a pair of stabilizers attached at opposite ends of a transverse stabilizer rod, wherein the stabilizers have a shape of a circular vector with a rounded side forming the bottom base portion. In preferred embodiments, at least one of the plurality of multifunctional chairs that is a wheeled chair has a wheeled cart configuration, the wheeled art configuration being configured for holding and transporting from 2 to 5 of the plurality of multifunctional chairs, and the plurality of multifunctional chairs comprising the stabilizers so as to have a more compact fully folded configuration.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings.

FIGS. 7A and 7B are perspective drawings of an upright lounger assembly of a wheeled multifunctional chair according to embodiments of the invention, wherein FIG. 7A is of a lounger assembly in a substantially reclined configuration and FIG. 7B is of a lounger assembly in a substantially upright configuration.

FIGS. 14A and 14B are perspective drawings of an lounger assembly of a stackable folding chair apparatus according to embodiments of the invention, wherein FIG. 7A shows the lounger assembly in a substantially reclined configuration and FIG. 7B shows the lounger assembly in a substantially upright configuration.

Figure 1A:
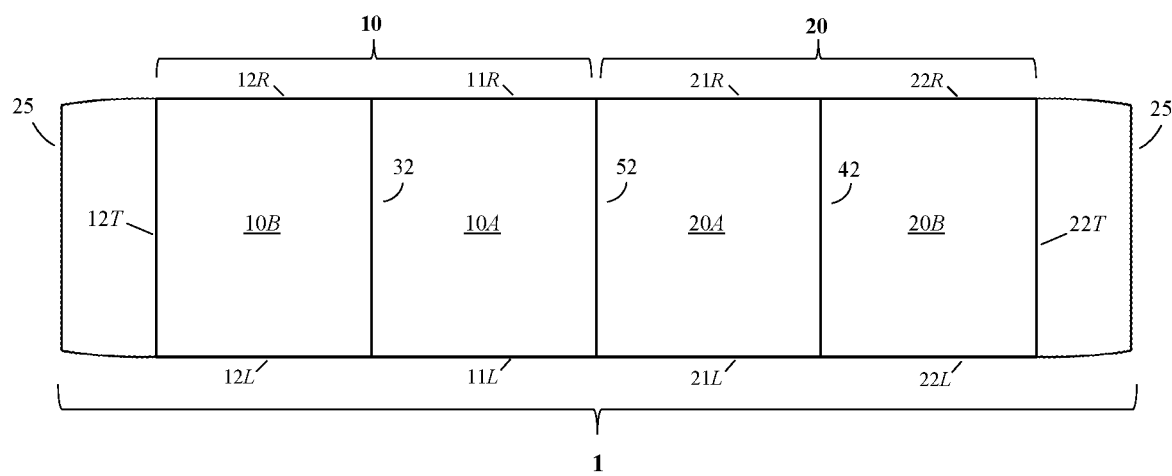
FIG. 1A is a simple illustration of the main frame and sub-frames of a wheeled multifunctional chair apparatus and FIG. 1B is a perspective view of a wheeled multifunctional chair apparatus in a flat lounger configuration according to an embodiment of the invention.

The appended figures are presented to aid in understanding of the present invention. However, the scope of the invention is not intended to be limited by the specific embodiments shown in the Figures. Specifically, a person having ordinary skill in the art will realize that numerous changes and variations may be made without departing from the spirit of the invention, and such changes and/or variations are within the scope of the present invention.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

The terminology used herein is for describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments. Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

An object of the present invention is to provide a multifunctional chair that easily converts from one assembly (mode) to another, and is configured to convert into all of the following separately definable and useful assemblies: (1) flat bed assembly; (2) reclining lounger assembly; (3) short beach chair assembly; (4) regular chair assembly; (5) rolling cart assembly; and (6) compact folded assembly. Each of the assemblies (1)-(6) are described below with reference to the additional Figures depicting the same.

Turning first to FIG. 1A, provided is top surface view of the various structural elements of a multifunctional chair apparatus of the invention in a fully unfolded configuration. As shown, the multifunctional chair apparatus is comprised a substantially elongated or rectangular main frame 1. The main frame 1 forms the foundation of each additional configuration of the multifunctional chair apparatus of the invention discussed in further detail below.

In embodiments, the main frame 1, which includes the various frame members 11R, 11L, 12R, 12L, 12T, 21R, 21L, 22R, 22L, 22T discussed below, is made of aluminum or a similar material for lightness and strength, but any suitable rigid and durable material may be used. An elongated or rectangular surface formed by the main frame 1 is covered by a covering material, such as canvas, or any other durable fabric suitable for outdoor use.

The main frame 1 is comprised of at least two smaller and substantially rectangular frame assemblies: a primary frame assembly 10 and a secondary frame assembly 20. The primary frame assembly 10 and the secondary frame assembly 20 are foldably connected by a central hinge assembly 150 that is disposed at a substantially central portion of the main frame 1 between the primary frame assembly 10 and the secondary frame assembly 20. As part of the central hinge assembly 150, a central rod 52 runs transversely across the main frame 1 between the primary frame assembly 10 and the secondary frame assembly 20 in a direction perpendicular to the elongated direction of the main frame 1. The primary frame assembly 10 and the secondary frame assembly 20, connected by the central hinge assembly 150, are foldable along the central transverse rod 52. An overall length of the substantially elongated and rectangular main frame assembly is approximately double the folded length when the primary frame assembly 10 is folded against the secondary frame assembly 20.

The primary frame assembly 10 of the main frame 1 is comprised of two smaller and approximately equally sized frames: a proximal primary frame 10A, and a distal primary frame 10B. The proximal and distal primary frames 10A and 10B are disposed on opposite sides of a primary rod 32 running transversely across a substantially central portion of the primary frame assembly 10 in a direction perpendicular to the elongated direction of the main frame 1. Likewise, the secondary frame assembly 20 is comprised of two smaller and approximately equally sized frames: a proximal secondary frame 20A, and a distal secondary frame 20B. The proximal and distal secondary frames 20A and 20B are disposed on opposite sides of a secondary rod 42 running transversely across a substantially central portion of the secondary frame assembly 20 in a direction perpendicular to the elongated direction of the main frame 1.

In the primary assembly 10, the proximal primary frame 10A, disposed between the central rod 52 and the primary rod 32, is laterally defined by proximal primary frame members 11R and 11L, the proximal primary frame members 11R and 11L defining elongated parallel sides of the proximal primary frame 10A. The distal primary frame 10B of the primary assembly 10, which is separated and rotatably connected to the proximal primary frame 10A by the primary hinge assembly 130, is laterally defined by distal primary frame members 12R and 12L defining elongated parallel sides of the distal primary frame 10B, and by distal primary frame member 12T defining a transverse side of the distal primary frame 10B and an end portion of the main frame 1, wherein the frame member 12T is disposed in a direction perpendicular to the elongated direction of the proximal and distal primary frame members 11R, 11L, 12R, and 12L which together define elongated parallel sides of the primary assembly 10 of the main frame 1.

In the secondary assembly 20, the proximal secondary frame 20A disposed between the central rod 52 and the secondary rod 42 is laterally defined by proximal secondary frame members 21R and 21L, the proximal secondary frame members 21R and 21L defining elongated parallel sides of the proximal secondary frame 20A. The distal secondary frame 20B of the secondary assembly 20, which is separated and rotatably connected to the proximal secondary frame 20A by the secondary hinge assembly 180, is laterally defined by distal secondary frame members 22R and 22L defining elongated parallel sides of the distal secondary frame 20B, and by distal secondary frame member 22T defining a transverse side of the distal secondary frame 20B and an opposite end portion of the main frame 1 from that defined by distal primary frame member 12T, wherein the frame member 22T is disposed in a direction perpendicular to the elongated direction of the proximal and distal secondary frame members 21R, 21L, 22R, and 22L which together define elongated parallel sides of the secondary assembly 20 of the main frame 1.

The terms "proximal" and "distal" as used herein are used generally to define a location of each smaller frame in relation to the central hinge assembly 150. That is, the proximal primary frame 10A and the proximal secondary frame 20A are rotatably coupled to and separated by the central rod 52 of the central hinge assembly 150, whereas the distal primary frame 10B and the distal secondary frame 20B are located on opposite sides of the proximal primary frame 10A and the proximal secondary frame 21A, respectively, and thus are "distal" in their location from the central hinge assembly 150 which is disposed in a substantially central portion of the main frame 1.

Figure 1B:
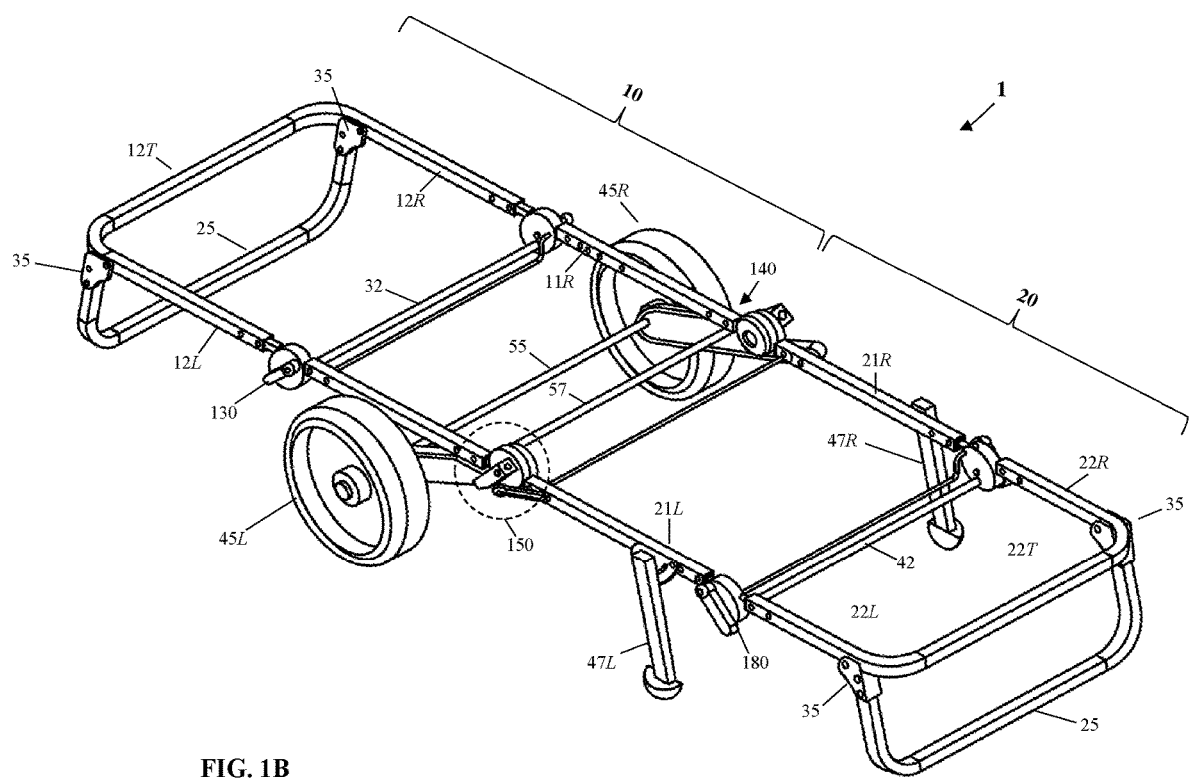

Turning now to FIG. 1B, provided is a more detailed view showing various rotational components of the main frame 1, which allow for the multifunctional aspect of the chair apparatus according to embodiments of the invention. Illustrated in FIG. 1B is a multifunctional chair apparatus of the invention again in a fully unfolded configuration, hereinafter referred to as the "Flat Bed Assembly" 100.

A multifunctional chair apparatus according to the present invention comprises multiple hinge assemblies configured to easily rotate and fold enjoined portions with respect to one another. In preferred embodiments, the multifunctional chair apparatus comprises a central hinge assembly 150 comprised of rotational hinges 50R and 50L on opposite ends of a central transverse rod 52 which serves as a central portion of the main frame 1 separating and also interconnecting the primary assembly 10 and the secondary assembly 20. As shown in FIG. 1B, substantially similar hinge assemblies are also included in each of the primary assembly 10 and the secondary assembly 20 disposed on opposite sides of the central hinge assembly 150 and specifically the central transverse rod 52.

As shown in FIG. 1B, a primary hinge assembly 130 comprised of rotational hinges 30R and 30L on opposite ends of a primary transverse rod 32 is disposed in a substantially central portion of the primary assembly 10 separating and also interconnecting the proximal and distal primary frames (10A and 10B in FIG. 1A) defined by proximal primary frame members 11R and 11L and distal primary frame members 12R, 12L, and 12T, respectively. Similarly, a secondary hinge assembly 180 comprised of rotational hinges 40R and 40L on opposite ends of a secondary transverse rod 42 is disposed in a substantially central portion of the secondary assembly 20 separating and also interconnecting the proximal and distal secondary frames (20A and 20B in FIG. 1A) defined by proximal secondary frame members 21R and 21L and distal secondary frame members 22R, 22L, and 22T, respectively.

In embodiments, the main frame further comprises a subframe 25 pivotably coupled to the distal primary frame members 12R and 12L by pivoting joints 35 so as to extend over and in parallel with the distal primary frame member 12T. The main frame 1 further comprises another subframe 25 pivotably coupled to the distal secondary frame members 22R and 22L by pivoting joints 35 so as to extend over an in parallel with the distal secondary frame member 22T. The subframes 25 are pivotably coupled to the opposite short sides of the main frame 1 by pivoting joints 35 attached at or near the end corner portions of the main frame 1 at which portions the distal primary frame members 12R and 12L in the primary frame assembly 10 and the distal secondary frame members 22R and 22L in the secondary frame assembly 20 merge into the transverse distal primary frame member 12T and distal secondary frame member 22T, respectively. Based on the configuration of the multifunctional chair apparatus, the subframes 25 attached at opposite end portions of the main frame 1 can be folded flat against and under the distal primary frame members 12R and 12L and the distal secondary frame members 22R and 22L, respectively. Alternatively, the subframes 25 can be extended or folded approximately 90° with respect to the main frame 1 so as to provide additional support to the multifunctional chair apparatus.

Figure 2:
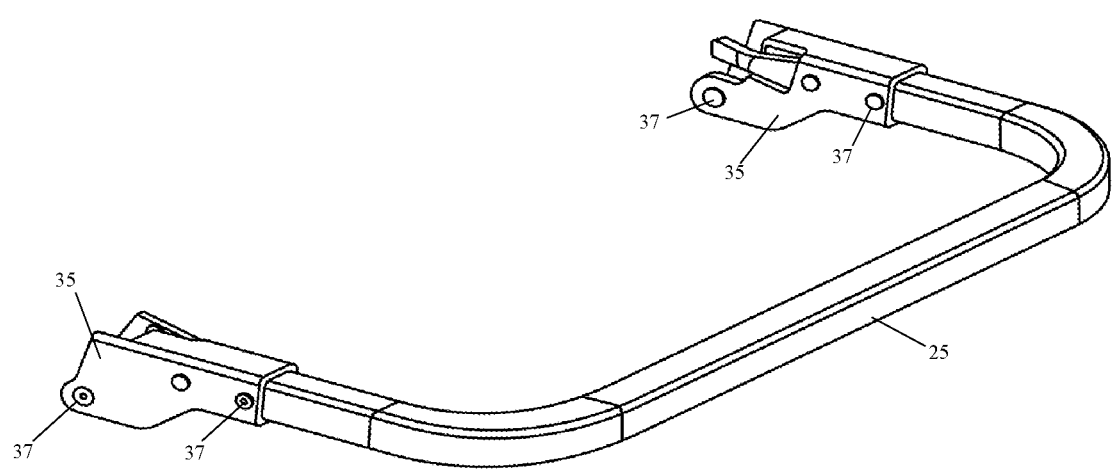
FIG. 2 is a perspective drawing of a sub-frame of a multifunctional chair apparatus according to an embodiment of the invention.

Provided in FIG. 2 is a clearer depiction of the subframes 25 in assembly with the pivoting joints 35. Merely for identification purposes, the subframe 25 shown in FIG. 2 is described in relation to the distal secondary frame members 22R and 22L, but the description applies equally to the opposite subframe 25 pivotably coupled to the distal primary frame members 12R and 12L. As shown in FIG. 2, joints 35 pivotably attach the subframe 25 to end portions of the distal secondary frame members 22R and 22L. A plurality of rivets 37 secure the subframe 25 within the joints 35. According to embodiments of the invention, the subframes 25 are pivotably attached at distal end portions of the primary and secondary frame assemblies 10 and 20, and are rotatable up to 180° to a position ranging from laterally aligned and extending over the distal end portions of the primary and secondary frame assemblies 10 and 20, rotated about 90° from the main frame so as to provide an additional support that is perpendicular to the lateral surface of the main frame 1 it supports, or fully rotated about 180° so as to fold flat against an underside of the distal secondary frame members 22R and 22L (and/or distal primary frame members 12R and 12L on the opposite distal end portion of the main frame 1.

Returning to FIG. 1B, the main frame 1 further comprises support legs 47R, 47L disposed on opposing parallel sides of the main frame 1. In embodiments, the support legs 47R and 47L are pivotably connected to parallel elongated sides of the main frame 1, and specifically to the proximal secondary frame members 21R and 21L, respectively. The support legs 47R and 47L are coupled to the proximal secondary frame members 21R and 21L by pivoting joints 44R, 44L such that, based on the desired assembly of the multifunctional chair apparatus, they can be folded flat against an underside of the proximal secondary frame members 21R and 21L or extended so as to provide an additional support to the multifunctional chair apparatus to the main frame 1 to provide support to the multifunctional apparatus. In embodiments, the support legs 47R and 47L can be pivoted about 90° around a vertical position supporting the multifunctional apparatus, and optionally locked into place, or can be folded inwardly (towards an underside surface of the main frame 1) to be flush with the proximal secondary frame members 21R, 21L, and optionally locked into place (such as e.g., in a folded configuration 600 to facilitate transport and/or for ease of storage as shown in, e.g., FIG. 11).

In embodiments, the multifunctional chair apparatus of the invention may further comprise, as part of the main frame 1, a pair of wheels 45R, 45L reversibly and pivotably attached to the main frame 1. The wheels 45R, 45L are attached in parallel to opposing sides of the primary frame assembly 10, the primary frame assembly 10 being defined by the proximal primary frame members 11R, 11L rotatably connected through the primary hinge assembly 130 to the distal primary frame members 12R, 12L. The wheels 45R, 45L are provided in parallel and within the same lateral axis of the elongated main frame 1, separated by a wheel axle rod (the central rod) 55 transversely disposed across the elongated main frame 1 in a direction perpendicular to the direction of the frame members defining in parallel the elongated direction of main frame 1.

Figure 5A:
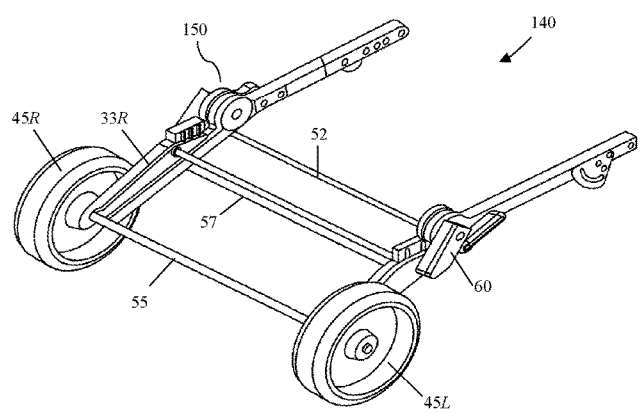
FIGS. 5A and 5B are perspective drawings of a wheel support assembly of a wheeled multifunctional chair apparatus according to an embodiment of the invention.
Figure 5B:
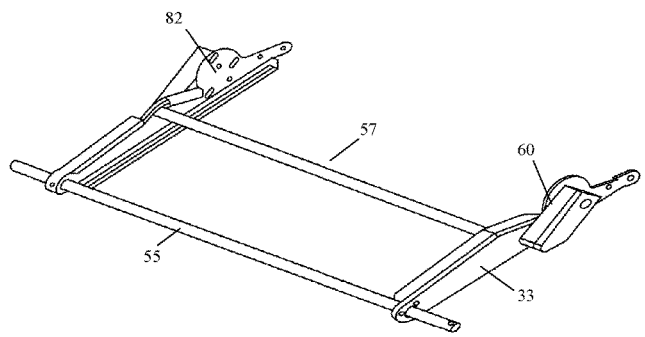

In embodiments, the wheels 45R, 45L are attached to the elongated main frame 1 by a wheel support assembly 140 as shown in FIGS. 5A and 5B. As shown in FIG. 5A, the wheel support assembly 140 is comprised of the wheel axle rod 55 transversely disposed between and rotatably connecting the wheels 45R and 45L, and extension arms 33R and 33L laterally disposed on opposite sides of the main frame 1 between the wheels 45R, 45L and the central hinge assembly 150. In embodiments, the extension arms 33R and 33L are coupled in parallel to central hinges 50R and 50L at one end and to the wheel axle rod 55 at the other end. For added support and stability, a wheel axle support rod 57 is transversely disposed between opposite sides (R and L) of the wheel support assembly 140 of the main frame 1. A latch handle 60 on an outer surface of the extension arm 33L allows for easy release and rotation of the wheel assembly 140 around the central hinges 50R and 50L.

As an object of the invention, a substantially rectangular main frame as shown in FIG. 1 can be configured and converted into additional assemblies or configurations of the multifunctional chair apparatus as described herein. Switching from one configuration to another requires only a simple movement of the adjustable hinges to different positions.

In embodiments, the primary frame assembly 10 and the secondary frame assembly 20 are foldable onto each other and fully rotatable around the central hinge assembly 150. The primary frame assembly 10 and the secondary frame assembly 20 are each also foldable into two smaller rectangular frame portions 10A, 10B and 20A, 20B, respectively, which are substantially rotatable around the primary hinge assembly 130 and the secondary hinge assembly 180, respectively.

In furtherance of an objective of the invention, provided is a hinge assembly configured to allow for 180° articulation upon itself in the same plane and that has defined lock positions. Specifically, the primary hinge assembly 130, the central hinge assembly 150, and the secondary hinge assembly 180 described herein connect and allow for self-articulation of the primary and secondary frame assemblies 10, 20 of the substantially rectangular main frame 1 and the individual frame members thereof.

Figure 3A:
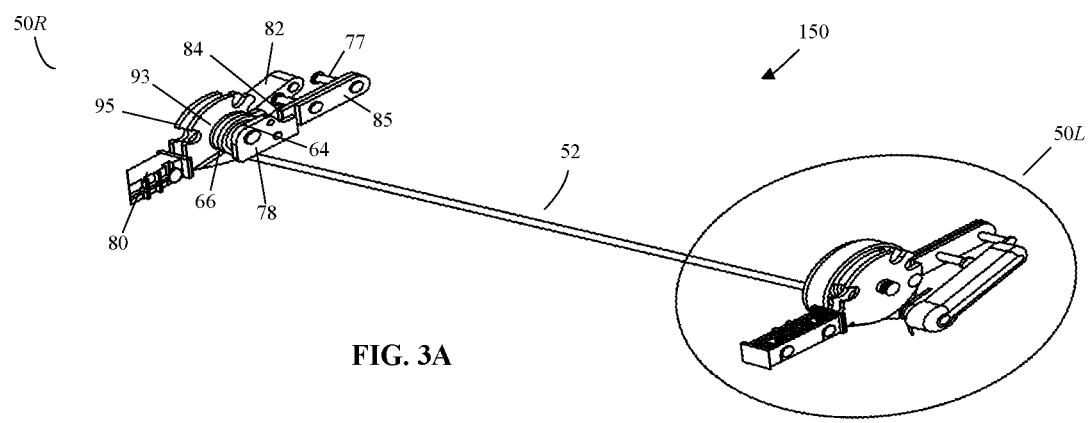
FIGS. 3A and 3B are perspective drawings of a hinge assembly of a wheeled multifunctional chair apparatus according to an embodiment of the invention.
Figure 3B:
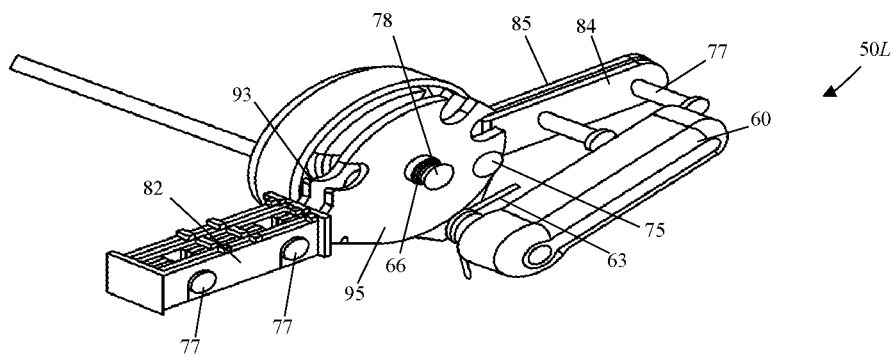
Figure 4A:
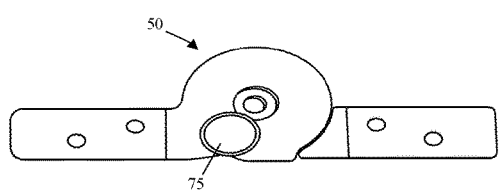
FIGS. 4A-4D show images of a hinge that can articulate upon itself according to an embodiment of the present invention, wherein the stops are provided on the locking hinge side at 0° (FIG. 4A), 100° (FIG. 4B), 140° (FIG. 4C), and 180° (FIG. 4D).
Figure 4B:
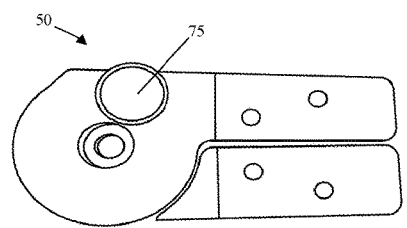
Figure 4C:
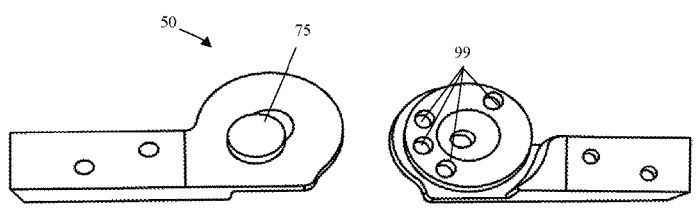
Figure 4D:
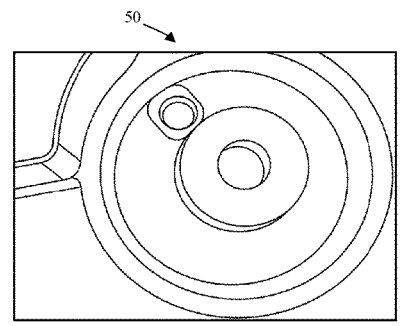

A detailed view of the novel hinge assembly incorporated into the multifunctional chair of the invention as the primary hinge assembly 130, the central hinge assembly 150, and the secondary hinge assembly 180 is provided in FIGS. 3A and 3B. For ease of discussion, the hinge assembly depicted in FIGS. 3A and 3B is referenced and depicted as the central hinge assembly 150; however, the structural configuration depicted in FIGS. 3A and 3B is equally applicable and representative of the primary hinge assembly 130 and the secondary hinge assembly 180.

Turning now to FIG. 3A, a central hinge assembly 150 comprises two parallel hinges—center hinge 50R and center hinge 50L—disposed on opposite ends of a central transverse rod 52, the central transverse rod 52 defining a central folding portion of the main frame 1 of the multifunctional chair apparatus of the invention. Viewing the configuration of the central hinge 50R as depicted in FIG. 3A in conjunction with the configuration of the central hinge 50L depicted from an alternative angle in FIG. 3B, the central hinges 50R and 50L of the central hinge assembly 150 individually comprise: an inner hinge comprised of an inner plate 85 and outer plate 84, the inner hinge being rotatably coupled to an outer hinge comprised of an inner plate 93 and outer plate 95, the inner hinge and outer hinge being rotatably coupled by a hinge rivet 78, the hinge rivet 78 running laterally through a central portion of the outer hinge outer plate 95 and inner plate 93 and the inner hinge inner plate 85 and outer plate 84, in order, wherein on an outer surface of the outer hinge outer plate 95 the rivet 78 is supported by a hinge plate 66, and between the outer hinge and the outer hinge is supported by a spacer 64 and a spring 66 hinge; a frame member insert 80 laterally disposed on a side of the coupled hinge plates, the frame member insert 80 being adjoined to and extending laterally from the outer hinge inner plate 93; and a frame member insert 82 laterally disposed on the opposing hinge assembly connected by a central transverse rod 52. Each opposing hinge assembly further comprises a plurality of rivets 77 for coupling the frame member insert 80 or 82 to frame member and outer hinge plates 95, 93 extending laterally on one side of the hinge assembly and lateral extensions of the inner hinge plates 85, 84 extending laterally on an opposite side of the hinge assembly. Also provided is a removable latch pin 75 spring loaded and configured for insertion into one of four holes formed through an outer surface (locking side) of the hinge assembly, the four holes being configured as hinge locking points at predetermined locations of 0°, 100°, 140°, and 180° around the circular hinge assembly 150. A latch handle 60 adjoined with a spring latch 63 is also provided on an outer/exterior surface of the outer hinge outer plate 95 for release of the latch pin 75.

The hinge assembly 150 according to embodiments of the invention may be further explained by the images provided FIGS. 4A-4D, showing in particular the rotational aspect with respect to the hinge locking points 99 provided at 0°, 100°, 140°, and 180 around the circular hinge 50 and the removable latch pin 75 configured for insertion therein.

Having described above, specifically in reference to depictions provided in FIGS. 3A-3B and FIGS. 5A-5B, general configurations and structural features of the primary hinge assembly 130, central hinge assembly 150, secondary hinge assembly 180, and wheel assembly 140, the descriptions of the assemblies comprised in the multifunctional chair apparatus of the invention are incorporated in the additional disclosure below insofar as reference is made to any one or more of the assemblies 130, 150, 180 and 140. Furthermore, having described individual assemblies comprised by the general main frame 1 that forms the foundation of the multifunctional chair apparatus of the invention, the various configurations encompassed by the invention are described in detail below.

As noted above, an object of the present invention is to provide a multi-functional chair that easily converts from one configuration (mode) to another, and includes all of the following separately definable and useful configurations: (1) flat bed configuration; (2) reclining lounger configuration; (3) low beach chair configuration; (4) regular chair configuration; (5) rolling cart configuration; and (6) compact folded configuration. Each of the assemblies (1)-(6) are described below in reference to the additional Figures depicting the same.

Figure 6A:
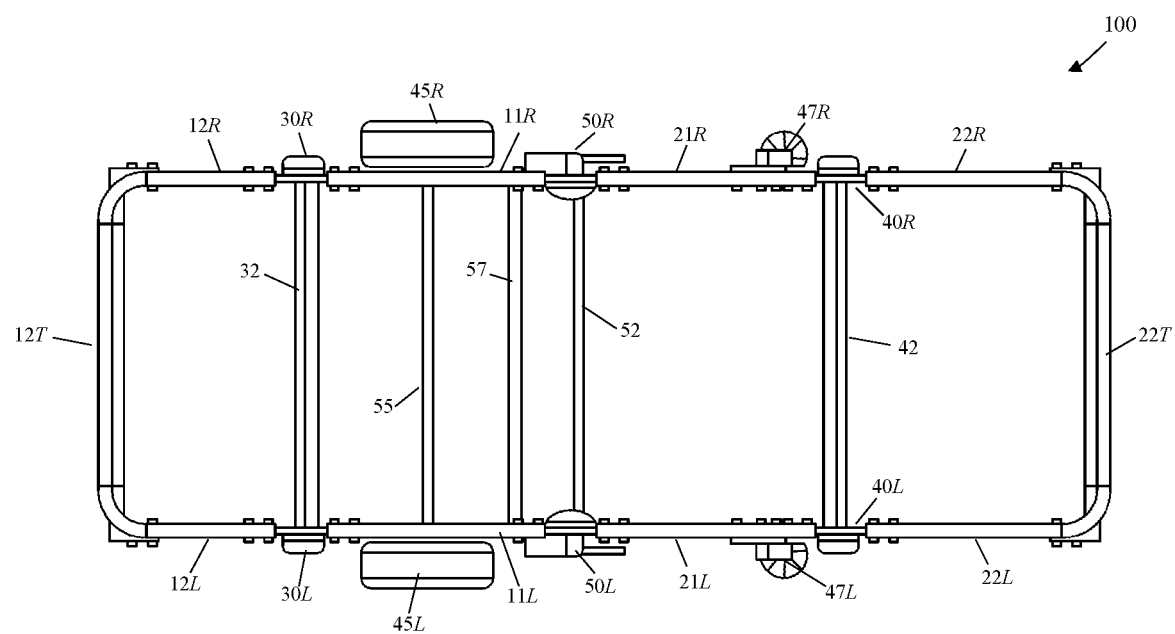
FIGS. 6A and 6B provide a top-down and side perspective view of a flat bed assembly of a wheeled multifunctional chair according to an embodiment of the invention.
Figure 6B:
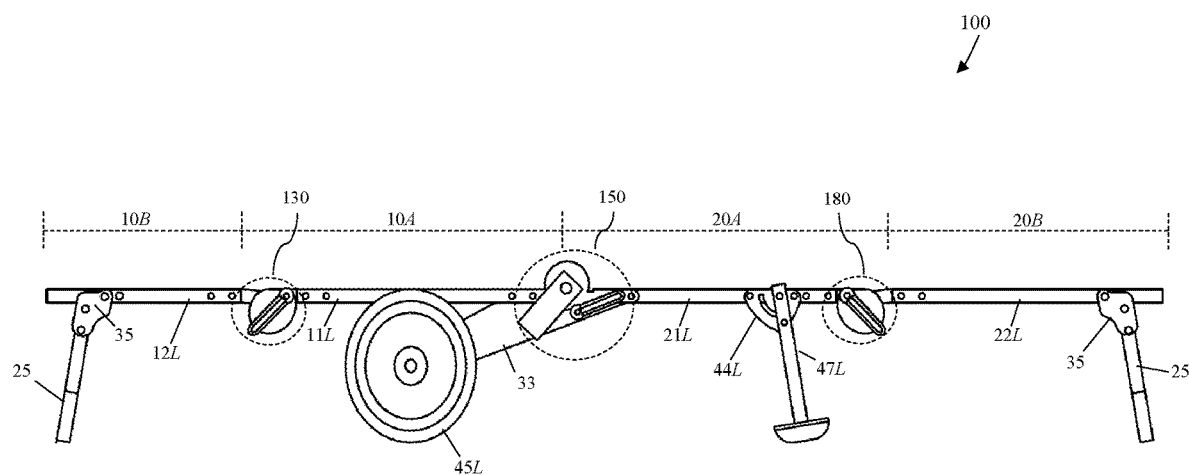

Turning first to FIGS. 6A-6B, depicted is a multifunctional chair of the invention in a flat bed assembly 100. Provided is a substantially elongated or rectangular main frame 1 comprising a primary frame assembly 10 foldably connected to a secondary frame assembly 20 by a center hinge assembly 150, the center hinge assembly 150 comprising a central transverse rod 52 that runs laterally across the main frame 1 in a direction transverse to the direction of elongation and separates the primary assembly 10 from the secondary assembly 20.

The primary frame assembly 10 is comprised of two smaller frames foldably connected by a primary hinge assembly 130, the primary hinge assembly 130 comprising a primary lateral rod 42 that runs laterally across a substantially central portion of the primary frame assembly 10 in a direction transverse to the direction of elongation of the main frame 1 and separates the two smaller frames. The proximal frame 10A of the primary frame assembly 10 is defined by a parallel set of proximal primary frame members 11R, 11L along the elongated direction of the main frame 1, the central transverse rod which runs perpendicularly between one end of the frame members 11R and 11L, and the primary transverse rod 42 that runs perpendicularly between the other end of the frame members 11R and 11L. The distal frame 10B of the primary frame assembly 10 is defined by a parallel set of distal primary frame members 12R and 12L along the elongated direction of the main frame 1, the primary transverse rod 42 that runs perpendicularly between the distal primary frame members 12R and 12L and separates the proximal and distal frames (10A, 10B) of the primary frame assembly 10, and a transverse distal primary frame member 12T that connects the parallel distal primary frame members 12R and 12L and forms a first of two shorter sides of the substantially elongated rectangular main frame 1.

The proximal primary frame members (11R and 11L) are rotatably connected to the distal primary frame members (12R and 12L) by and through primary hinges (30R and 30L) of the primary hinge assembly 130, respectively. The proximal primary frame members 11R, 11L are also rotatably connected to the secondary frame assembly 20 by and through central hinges 50R and 50L of the center hinge assembly 150. That is, in defining the primary frame assembly 10, the proximal primary frame members 11R, 11L are rotatably connected to the distal primary frame members 12R, 12L by the primary hinge assembly 130. At one end, the parallel set of distal primary frame members (12R and 12L) are rotatably connected to the parallel set of proximal primary frame members (11R, 11L) through primary hinges (30R, 30L) of the primary hinge assembly 130, and at the opposite end the parallel set of distal primary frame members 12R, 12L merge into a transverse frame member 12T running between the distal primary frame members 12R, 12L and perpendicularly to the direction of the parallel frame members defining the elongated main frame.

With respect to the secondary frame assembly 20, it is also comprised of two smaller frames—a proximal secondary frame 20A and a distal secondary frame 20B—foldably connected by a secondary hinge assembly 180, wherein the proximal secondary frame 10A is defined by a parallel set of proximal secondary frame members 21R, 21L and the distal frame is defined by a parallel set of distal secondary frame members 22R, 22L. The proximal secondary frame members 21R, 21L are likewise rotatably connected to the primary hinge assembly 10 by and through center hinges 50R, 50L of the center hinge assembly 150. In defining the secondary frame assembly 20, the proximal secondary frame members 21R, 21L are rotatably connected to the distal secondary frame members 22R, 22L by the secondary hinge assembly 180. At one end, the parallel set of distal secondary frame members (22R and 22L) are rotatably connected to the parallel set of proximal secondary frame members (21R and 21L) through secondary hinges (40R, 40L) of the secondary hinge assembly 180, and at the opposite end the parallel set of distal secondary frame members 22R, 22L merge into a transverse frame member 22T laterally disposed between the distal secondary frame members 22R, 22L in a direction perpendicular to the elongated direction of the main frame assembly 1 and forming the second of two shorter sides of the substantially elongated and rectangular main frame 1.

According to embodiments, a pivotably movable subframe 25 is attached along the two shorter sides of the substantially elongated and rectangular main frame 1 at a location of the distal primary and secondary frame members 12T and 22T. One of the pivotably movable subframes 25 is attached to each of the second primary frame members 12R, 12L through a joint 35 so as to extend over and in parallel with the transversely disposed distal primary frame member 12T in the elongated direction of the substantially elongated and rectangular main frame 1; and the second of the pivotably movable subframes 25 is attached to each of the distal secondary frame members 22R, 22L through a joint 35 so as to extend over and in parallel with the transversely disposed distal primary frame member 22T in the elongated direction of the substantially elongated and rectangular main frame 1. The subframes 25, preferably provided on opposite end portions of the main frame 1, are pivotably attached to the primary frame assembly 10 and the secondary frame assembly 20, forming end portions of the substantially elongated and rectangular main frame, and are rotatable 180° around the joints 35. The subframes 25 pivot around the joints 35 and can be placed in a position ranging from (i) flush with the main frame, (ii) about 45° from the main frame, and (iii) about 90° from the main frame.

Also attached to the main frame, at opposing sides of the secondary frame assembly 20, are legs 47R, 47L. In embodiments, the legs 47R and 47L are attached to opposing proximal secondary frame members 21R and 21L via pivoting joints 44R, 44L. The proximal secondary frame members 21R and 21L comprise, at corresponding locations, pivoting joints 44R, 44L from which legs 47R, 47L can be extended out or folded in based on the desired assembly of the multifunctional chair apparatus. In embodiments, the legs 47R, 47L can be pivoted into a vertical position and optionally locked into place, or can be folded in so as to be flush with each of the proximal secondary frame members 21R, 21L and optionally locked into place (such as e.g., in a folded configuration 600 to facilitate transport and/or for ease of storage as shown in FIG. 11).

The multifunctional chair apparatus of the invention may further comprise a wheel assembly 140 comprising wheels 45R, 45L rotatably mounted to extension arms 33R, 33L that are rigidly attached to the central hinges 30R, 30L of the hinge assembly 150 in the main frame 1, specifically in the proximal primary frame 10A. According to an embodiment of the invention, the wheels 45R and 45L are attached in parallel to opposing sides of the primary frame assembly 10, the primary frame assembly 10 being defined by proximal primary frame members 11R, 11L rotatably connected through the primary hinge assembly 130 (primary hinges 30R, 30L) to distal primary frame members 12R, 12L. The wheels 45R, 45L are provided on an underside, in parallel, and within the same linear axis of the substantially elongated and rectangular main frame 1, separated by a wheel axle rod 55 transversely disposed across the elongated main frame 1 in a direction perpendicular to the direction of the frame members defining in parallel the elongated direction of the substantially elongated and rectangular main frame 1. In embodiments, the wheels 45R, 45L are attached to the elongated main frame 1 by a wheel support assembly 140 as described herein which comprises a wheel axle rod 55 running laterally between the wheels 45R, 45L.

Figure 7A:
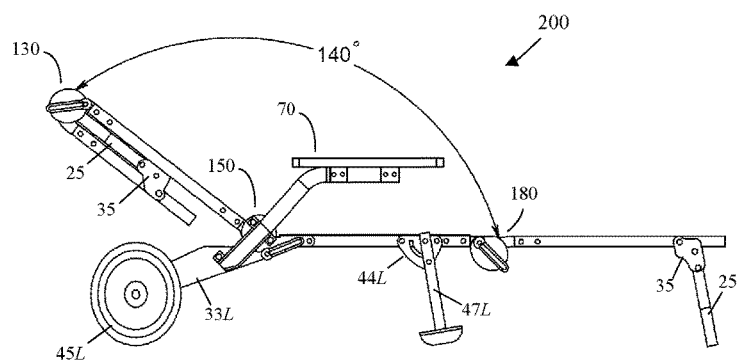
Figure 7B:
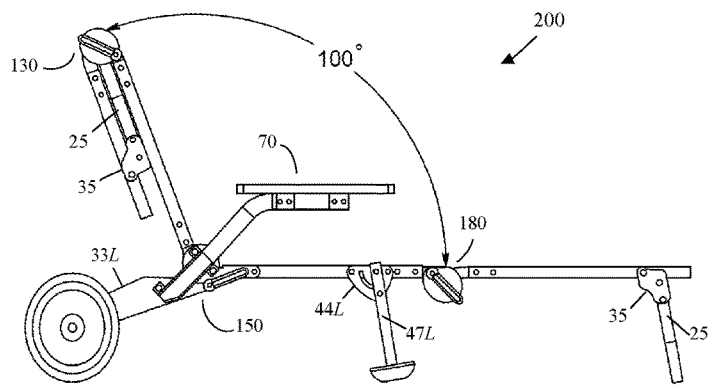

Turning now to FIGS. 7A and 7B, depicted is a multifunctional chair of the invention in a reclining lounger assembly 200. In this assembly, the reclining lounger assembly can have a reclined back portion shown in FIG. 7A, or an upright back as shown in FIG. 7B. In both embodiments of the reclining lounger assembly 200, the primary frame assembly 10 forms the "back" portion and the secondary frame assembly 20 forms the "base" portion. The subframe 25 extending from the secondary frame assembly 20 is rotated downwardly approximately 90° around the joints 35 to form an additional support for the base portion of the reclining lounger assembly 200.

As the back portion of the reclining lounger assembly 200 shown in both FIGS. 7A and 7B, the subframe 25 of the primary frame assembly 10 is folded by pivoting joints 35 around the distal primary frame member 12T (transverse frame member) onto an underside of the distal frame 10B of the primary frame assembly 10 formed by distal primary frame members 12R, 12L, and 12T. The distal primary frame 10B of the primary frame assembly 10 defined by the distal primary frame members 12R, 12L, 12T, having the subframe 25 folded to an underside thereof, is then also folded along the primary hinge assembly 130 onto an underside of the proximal frame 10A of the primary frame assembly 10 defined by the proximal primary frame members 11R and 11L. The primary frame assembly 10, now constituted essentially of the proximal primary frame 10A with the distal primary frame 10B and the subframe 25 folded under it, may be raised from a fully reclined position of 180° (i.e., a flat bed configuration 100) to a slightly reclined position of 140° (FIG. 7A) or an upright position of 90° (FIG. 7B) by rotationally moving/pushing the proximal primary frame members 11R, 11L around the central hinge assembly 150 until the desired preset locking position (e.g., 140° or 100°) is reached and the proximal primary frame members 11R and 11L which are rotationally coupled to the central hinge assembly 150 are locked to extend from the central hinge assembly 150 in the desired angle of recline.

In embodiments, arm rests are removably coupled to the primary frame assembly, specifically the proximal primary frame, and may comprise additional accessories or useful features, such as, e.g., a built-in cup holder. In alternative embodiments where the configuration of the multifunctional chair apparatus has the secondary frame assembly, specifically the proximal secondary frame, as the base and the primary frame as the back, arm rests are removably coupled to the secondary frame assembly.

Figure 8A:
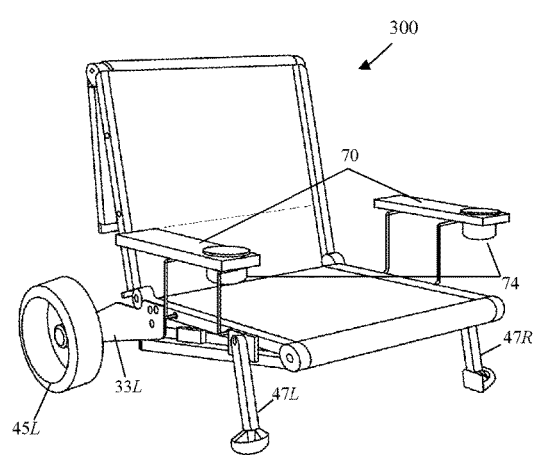
FIGS. 8A and 8B are perspective drawings of a beach chair assembly of a wheeled multifunctional chair according to an embodiment of the invention.
Figure 8B:
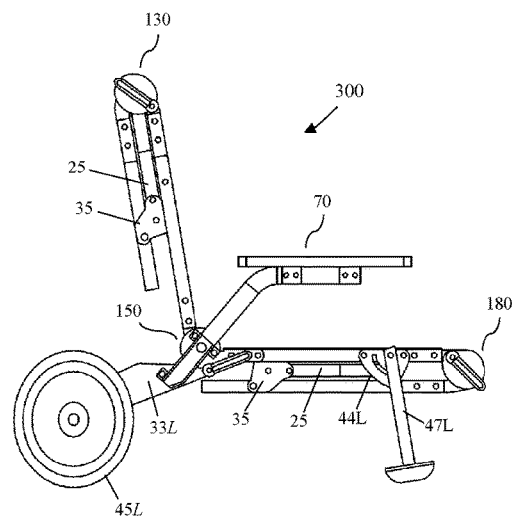

Shown in FIGS. 8A and 8B is a multifunctional chair of the invention in a low beach chair assembly 300. In embodiments, the low beach chair assembly 300 may be obtained by further folding of the assemblies 100 and 200 discussed above. That is, the substantially upright position of the back portion of the low beach chair assembly 300 has the same configuration and can be obtained in the same manner as in the reclining lounger assembly 200. In this configuration, however, the subframe 25 extending from the secondary frame assembly 20 is likewise folded around the second secondary frame member 22T by pivoting joints 35 onto an underside of the distal frame 20B of the secondary frame assembly 20 defined by distal secondary frame members 22R, 22L, and 22T. The distal secondary frame 20B defined by the distal secondary frame members 22R, 22L, 22T, having the subframe 25 folded to an underside thereof, is then also folded along the secondary hinge assembly 180 onto an underside of the proximal secondary frame 20B of the secondary frame assembly 20 defined by the proximal secondary frame members 21R and 22L. In the resulting configuration of the multifunctional chair of the invention, the primary frame assembly 10 functioning as the "back" is constituted essentially of the proximal primary frame 10A with the distal primary frame 10B and the subframe 25 folded onto themselves and under it, and the secondary frame assembly 20 functioning as the "base" disposed at approximately 90° from the back is constituted essentially of the proximal secondary frame 20A with the distal secondary frame 20B and the subframe 25 folded onto themselves and under it.

Figure 9A:
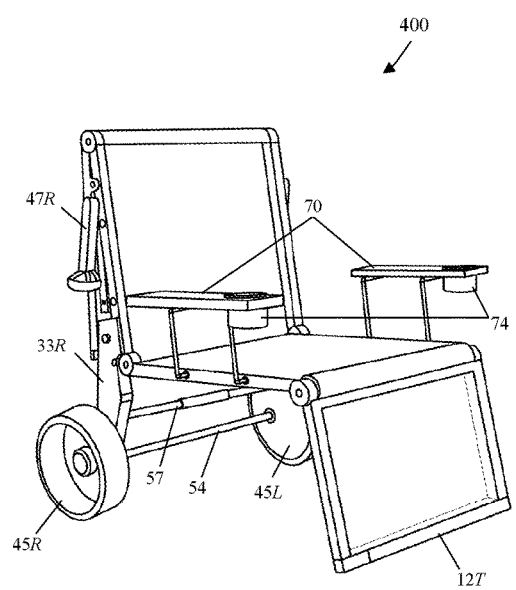
FIGS. 9A and 9B are perspective drawings of a regular chair assembly of a wheeled multifunctional chair according to an embodiment of the invention.
Figure 9B:
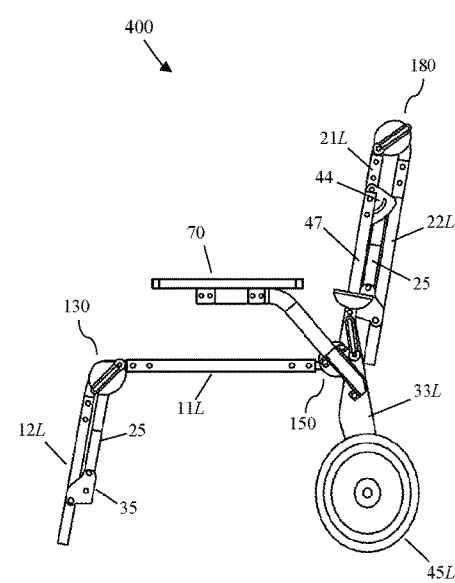

Turning now to FIGS. 9A and 9B, depicted is a multifunctional chair of the invention in a regular chair configuration 400. In this embodiment, the primary frame assembly 10 serves as the "base" and the secondary frame assembly 20 serves as the "back." By reversing the orientation of the main frame assembly 1 as compared to the assemblies 200 and 300 discussed above (in which the primary frame assembly 10 functions as the "back" and the secondary frame assembly 20 functions as the "base"), the alignment of the wheel assembly 140 is substantially aligned as a downward extension of the "back" formed by the secondary frame assembly 20.

In the regular chair assembly 400, the subframe 25 extending form the primary frame assembly 10 is folded by the pivoting joints 35 around the distal primary frame member 12T (transverse frame member) onto an underside of the distal frame 10B of the primary frame assembly 10 formed by distal primary frame members 12R, 12L, and 12T. The distal primary frame 10B of the primary frame assembly 10 having the subframe 25 folded onto an underside thereof is subsequently also rotated downwards along the primary hinge assembly 130 such that an angle of 100° is formed between an underside of the proximal primary frame 10A and the distal primary frame 10B with respect to the primary transverse rod 42. In the regular chair configuration 400, the secondary frame assembly 20 forms the "back" and is folded upwards around the central hinge assembly 150 such that the proximal secondary frame 20A is disposed at an angle of approximately 90° to the proximal primary frame 10A forming the "base." The subframe 25 extending from the secondary frame assembly 20 is folded by the pivoting joints 35 around the distal secondary frame member 22T (transverse frame member) onto an underside of the distal secondary frame 20B of the secondary frame assembly 20 formed by distal secondary frame members 22R, 22L, and 22T. The distal secondary frame 20B having the subframe 25 folded onto an underside thereof is subsequently also rotated around and folded downward onto an underside of the proximal frame 20A of the secondary frame assembly 20.

The support legs 47R, 47L attached to opposing proximal secondary frame members 21R and 21L are folded via the respective pivoting joints 44R, 44L to be substantially parallel or laterally aligned with the proximal and distal secondary frame members 21R, 21L, 22R, 22L. Arm rests (handle bars) 70 may be connected to the proximal primary frame members 11R and 11L.

Figure 10A:
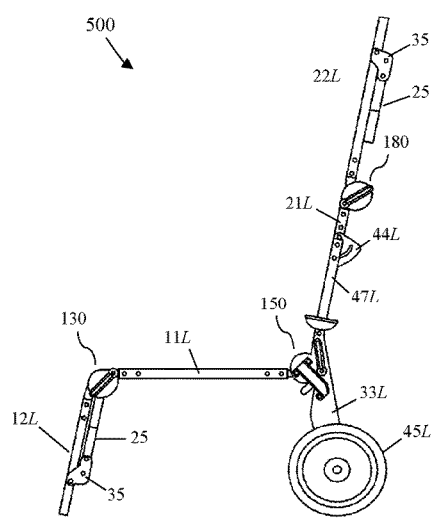
FIGS. 10A and 10B are perspective drawings of a high back chair or wheeled cart assembly of a wheeled multifunctional chair for use in the system according to an embodiment of the invention.

Another assembly within the scope of the invention is the rolling cart as shown in FIG. 10A. Similar to the standard chair assembly 400 discussed above, in this embodiment of the invention the primary frame assembly 10 serves as the "base" and the secondary frame assembly 20 serves as the "back." As in the assembly 400, the subframe 25 extending form the primary frame assembly 10 is folded by the pivoting joints 35 around the distal primary frame member 12T (transverse frame member) onto an underside of the distal frame of the primary frame assembly 10 formed by distal primary frame members 12R, 12L, and 12T. The distal primary frame 10B having the subframe 25 folded onto an underside thereof is subsequently also rotated downwards along the primary hinge assembly 130 such that an angle of about 100° is formed between an underside of the proximal frame and the distal frame of the with respect to the primary transverse rod 42. The distal primary frame 10B comprised of the distal primary frame members 12R, 12L, and 12T forms the support for the multifunctional chair of the invention.

The secondary frame assembly 20 forms a long "back" of the rolling cart assembly 500 and has an extended configuration in a vertical direction perpendicular to the "base." That is, the proximal secondary frame 20A and the distal secondary frame 20B of the secondary frame assembly 20 are rotatably coupled and substantially aligned at 180° to form an extended "back" section comprised of the proximal secondary frame 20A and the distal secondary frame 20B of the secondary frame assembly 20.

In certain embodiments, the support legs 47R, 47L attached to opposing proximal secondary frame members 21R and 21L are folded via the respective pivoting joints 44R, 44L to be substantially parallel or laterally aligned with the proximal and distal secondary frame members 21R, 21L, 22R, 22L. The subframe 25 extending form the secondary frame assembly 20 may be folded downward in a direction of a user by the pivoting joints 35 around the distal secondary frame member 22T (transverse frame member). In certain embodiments, the subframe 35 may be fully folded against an underside of the distal secondary frame 20B formed by distal primary frame members 22R, 22L, and 22T. Alternatively, the subframe 25 may be only partly folded, or rotated downwardly around the joints 35 approximately 90° to form a handle attachment for a user of the rolling cart 500.

Figure 10B:
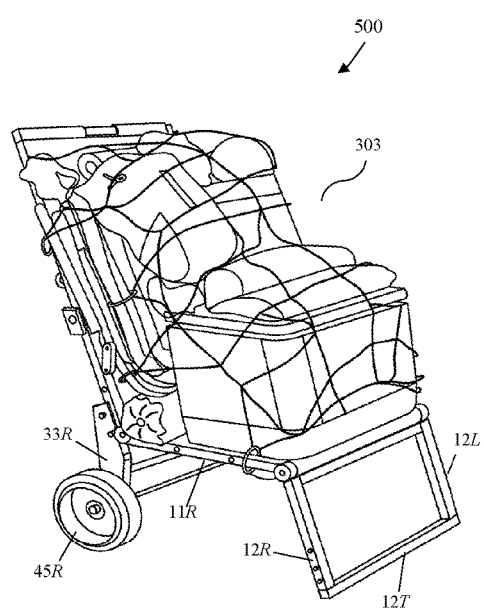

FIG. 10B shows the rolling cart assembly 500 when used to transport outdoor gear 303 and the like according to an object of the present invention. The cart assembly 500 is configured to hold and transport various objects, including one or more additional chair(s) of the invention in the folded assembly 600 discussed below.

Figure 11A:
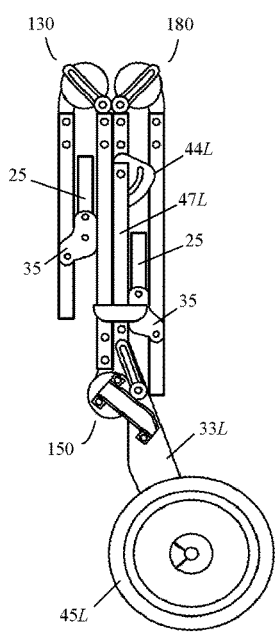
FIGS. 11A-11C are perspective drawings of a folded assembly of a wheeled multifunctional chair according to an embodiment of the invention.
Figure 11B:
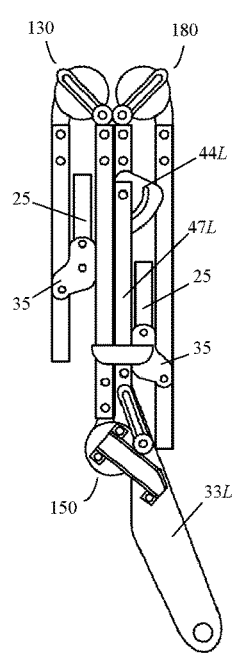
Figure 11C:
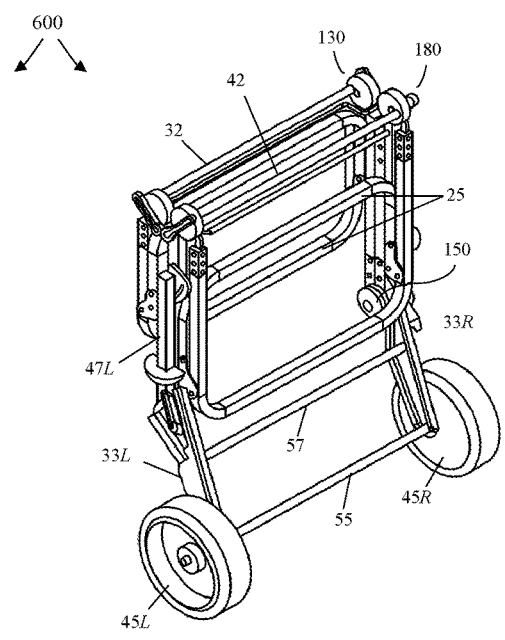

In addition to the individual and separately useful assemblies encompassed and obtainable by the multifunctional chair of the invention 100-500 discussed above, a further embodiment of the invention provides for the folded assembly 600 shown in FIGS. 11A-11C. According to this embodiment, as shown in, e.g., FIG. 11A, the subframe 25 extending from the primary frame assembly 10 is folded around the distal primary frame member 12T by pivoting joints 35 onto an underside of the distal primary frame 10B of the primary frame assembly 10. The distal primary frame 10B of the primary frame assembly 10, defined by distal primary frame members 12R, 12L, and 12T, having the subframe 25 folded onto an underside thereof, is then folded up to 180° (depending on the orientation of the proximal primary frame 10A in relation to the distal primary frame 10B around the primary hinge assembly 130) onto an underside of the proximal primary frame 10A of the primary frame assembly 10. The subframe 25 extending from the secondary frame assembly 20 is folded around the distal secondary frame member 22T by pivoting joints 35 onto an underside of the distal secondary frame 20B of the secondary frame assembly 20. The distal secondary frame 20B of the secondary frame assembly 20, defined by distal secondary frame members 22R, 22L, and 22T, having the subframe 25 folded onto an underside thereof, is then folded up to 180° (depending on the orientation of the proximal secondary frame 20B of the secondary frame assembly 20 in relation to the distal frame) around the primary hinge assembly 180 onto an underside of the proximal secondary frame 20A.

In embodiments, the primary frame assembly 10, now essentially configured as the proximal frame 10A of the primary frame assembly 10 having the distal frame 10B of the primary frame assembly 10 with the folded subframe 25 folded onto an underside thereof, and the secondary frame assembly 20, now essentially configured as the proximal frame 20A of the secondary frame assembly 20 having the distal frame 20B of the secondary frame assembly 20 with the folded subframe 25 folded onto an underside thereof, are folded around the central hinge assembly 150 onto top surfaces of each other so as to be aligned in parallel. In achieving the final folded configuration 600, the folded primary frame assembly 10 or the folded secondary frame assembly 20 can fold 180° around the central hinge assembly 150 onto the top surface of the opposite frame assembly, i.e., onto the top surface of the secondary frame assembly 20 or onto the top surface of the primary frame assembly 10, respectively. The support legs 47R and 47L, if in an extended position, are also folded so as to be aligned with the distal secondary frame members 22R and 22L, respectively.

In certain embodiments, as shown in FIG. 11B, the wheels 45R, 45L may be removed from the extension arms 33R, 33L for even more compactness of the folded assembly 600, which may be particularly desirable if stacking or transporting a plurality of the multifunctional chairs of the invention. The configuration of the folded assembly 600 is further shown in FIG. 11C, which provides a lateral view additionally depicting the wheel axle rod 55, wheel axle support rod 57, primary transverse rod 32, and secondary transverse rod 42.

It is a further object of the present invention to provide a system comprising a plurality of multifunctional chairs as described herein, wherein at least one of the plurality of chairs is foldable into the rolling cart configuration 500 such that a remainder of the plurality of multifunctional chairs can be arranged and transported thereon in their folded configuration 600. According to the system of the present invention, the plurality of multifunctional chairs other than the at least one chair foldable into the rolling cart configuration 500 may be chairs according to an alternative embodiment of the multifunctional wheeled chair apparatus as described herein and as depicted in the above-referenced FIGS. 1A-11C. For purposes of the following descriptions, chairs of this alternative embodiment will not be referenced as "wheeled" chairs or "wheeled" chair apparatuses, but merely as "multifunctional folding chairs," as such chairs do not comprise the wheels 45R, 45L of the wheel support assembly 140 discussed above.

Figure 12A:
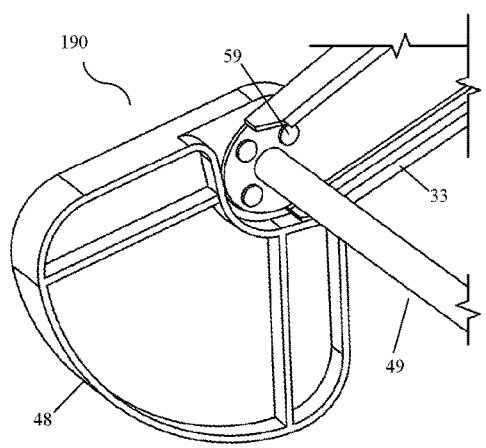
FIG. 12A is a perspective drawing of a stabilizer support assembly of a stackable folding chair apparatus according to an embodiment of the invention.
Figure 12B:
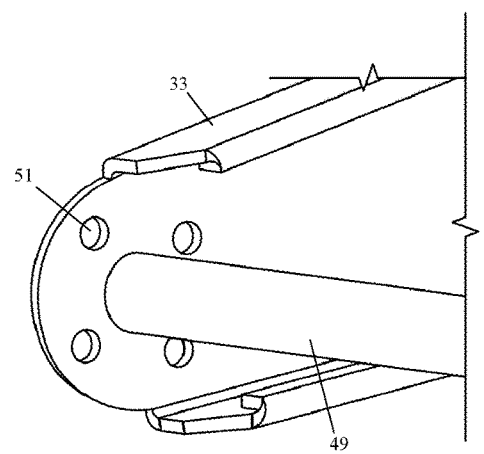
FIG. 12B is a perspective drawing of an extension arm with rivet holes for coupling a stabilizer thereto according to an embodiment of the invention.

Turning first to FIGS. 12A and 12B, provided is an alternative embodiment of the wheel support assembly 140 shown in FIGS. 5A and 5B. According to the system of the invention, multifunctional folding chairs, other than at least one multifunctional wheeled chair foldable into a rolling cart configuration 500, preferably comprise a stabilizer support assembly 190 in place of the wheel support assembly 140. As shown in the perspective drawings 12A and 12B, the support assembly comprises a pair of extension arms 33R, 33L (only 33R shown in drawings) on opposite ends of a stabilizer rod 49 transversely disposed across the elongated main frame 1 in a direction perpendicular to the elongated direction of the frame members. As shown in FIG. 12A, a pair of stabilizers 48R, 48L (only 48R shown in drawings) are attached to the elongated frame 1 of the multifunctional foldable chair assembly by a plurality of rivets 59 coupling the stabilizers 48R, 48L to the extension arms 33R, 33L through a corresponding plurality of rivet holes 51 in end attachment portions of the extension arms 33R, 33L, wherein the rivet holes 51 are preferably disposed in a configuration around or surrounding the stabilizer rod 49 attachment location on the extension arms 33R, 33L, as shown in FIG. 12B.

In preferred embodiments, the stabilizers 48R, 48L have a shape of a rounded triangle, specifically that of a circular sector or a "pie slice" with a bottom base portion formed by a curved side. A peak portion of the sector opposite the curved side is attachable to the end portions of the extension arms 33R, 33L through rivets 59 by alignment with the plurality of rivet holes 51. The internal design and structure of the stabilizers 48R, 48L furthermore incorporates a curved indentation or pocket for placement and additional support of the extension arms 33R, 33L therein. The curved indentation or pocket forms a substantially rounded sub-wall substantially parallel with the curved bottom side of the stabilizer near a top half portion of the stabilizer, and is further support by two vertical support structures each running in parallel to one of the side walls of the stabilizer, and extending between a bottom surface of the interior sub-wall forming the curved pocket and the curved bottom side of the stabilizer at 90°.

Figure 13A:
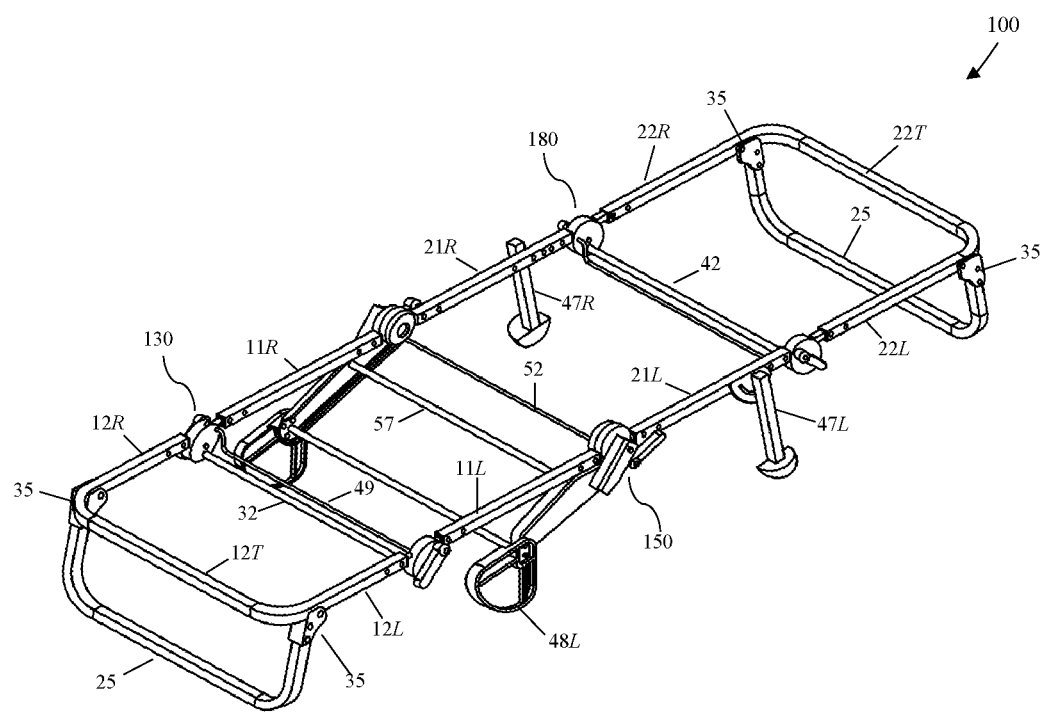
FIGS. 13A and 13B are top-down and side perspective drawings of a flat bed assembly of a stackable folding chair apparatus according to embodiments of the invention.
Figure 13B:
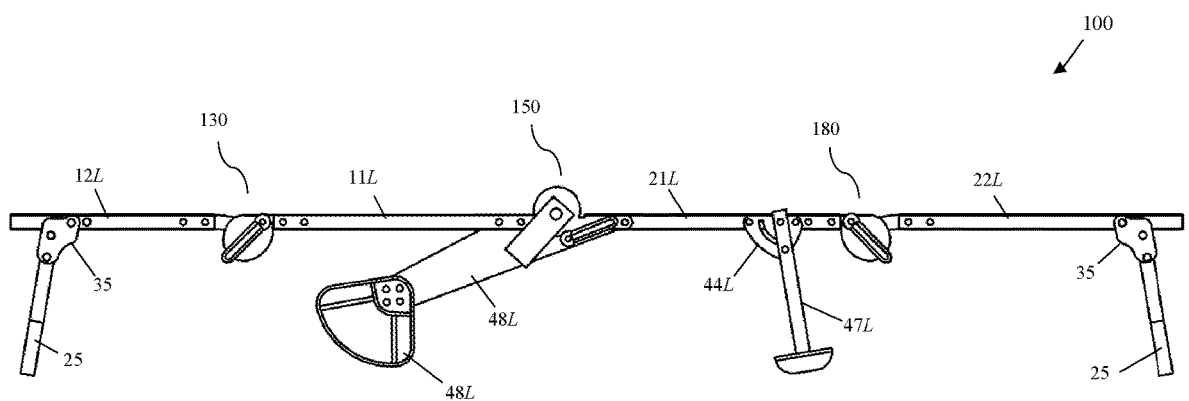

FIGS. 13A and 13B correspond substantially to the flat bed configuration 100 of the multifunctional wheeled chair apparatus shown in FIGS. 1B and 6B, respectively. With the exception of the stabilizers 48R and 48L on opposite ends of the transverse stabilizer rod 49 in place of the wheels 45R and 45L on opposite ends of the transverse wheel axle rod 55, the structural assembly and components of the multifunctional folding chair correspond to those of the multifunctional wheeled chair apparatus discussed herein in connection with aforementioned figures.

Figure 14A:
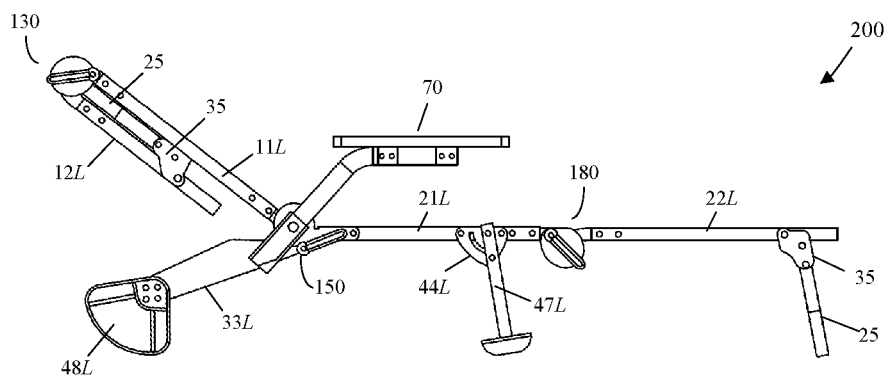
Figure 14B:
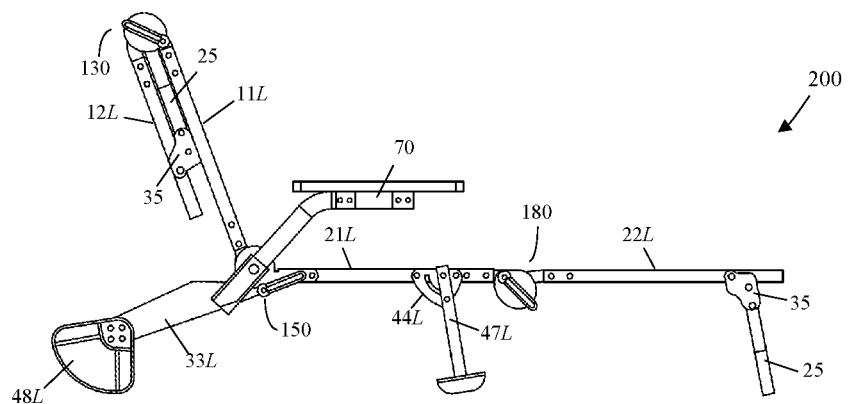

The multifunctional folding chair according to an alternative embodiment of the present invention has a configuration of a lounger substantially corresponding to that of the multifunctional wheeled chair apparatus. Accordingly, with the exception of the stabilizers 48R and 48L on opposite ends of the transverse stabilizer rod 49 in place of the wheels 45R and 45L on opposite ends of the transverse wheel axle rod 55, the reclining lounger assembly 200 shown in FIGS. 14A and 14B of a multifunctional folding chair shown substantially corresponds to the reclining lounger assembly 200 shown in FIGS. 7A and 7B of a multifunctional wheeled chair apparatus. In this assembly, the reclining lounger assembly can have a reclined back portion as shown in FIG. 14A, or an upright back as shown in FIG. 14B. In both embodiments of the reclining lounger assembly 200, the primary frame assembly 10 forms the "back" portion and the secondary frame assembly 20 forms the "base" portion. The subframe 25 extending from the secondary frame assembly 20 is rotated downwardly approximately 90° around the joints 35 to form an additional support for the base portion of the reclining lounger assembly 200.

As the back portion of the reclining lounger assembly 200 shown in both FIGS. 7A and 7B, the subframe 25 of the primary frame assembly 10 is folded by pivoting joints 35 around the distal primary frame member 12T (transverse frame member) onto an underside of the distal frame 10B of the primary frame assembly 10 formed by distal primary frame members 12R, 12L, and 12T. The distal primary frame 10B of the primary frame assembly 10 defined by the distal primary frame members 12R, 12L, 12T, having the subframe 25 folded to an underside thereof, is then also folded along the primary hinge assembly 130 onto an underside of the proximal frame 10A of the primary frame assembly 10 defined by the proximal primary frame members 11R and 11L. The primary frame assembly 10, now constituted essentially of the proximal primary frame 10A with the distal primary frame 10B and the subframe 25 folded under it, may be raised from a fully reclined position of 180° (i.e., a flat bed configuration 100) to a slightly reclined position of 140° (FIG. 14A) or an upright position of 90° (FIG. 14B) by rotationally moving/pushing the proximal primary frame members 11R, 11L around the central hinge assembly 150 until the desired preset locking position (e.g., 140° or 100°) is reached and the proximal primary frame members 11R and 11L which are rotationally coupled to the central hinge assembly 150 are locked to extend from the central hinge assembly 150 in the desired angle of recline.

In embodiments, arm rests are removably coupled to the primary frame assembly, specifically the proximal primary frame, and may comprise additional accessories or useful features, such as, e.g., a built-in cup holder. In alternative embodiments where the configuration of the multifunctional chair apparatus has the secondary frame assembly, specifically the proximal secondary frame, as the base and the primary frame as the back, arm rests are removably coupled to the secondary frame assembly.

Figure 15:
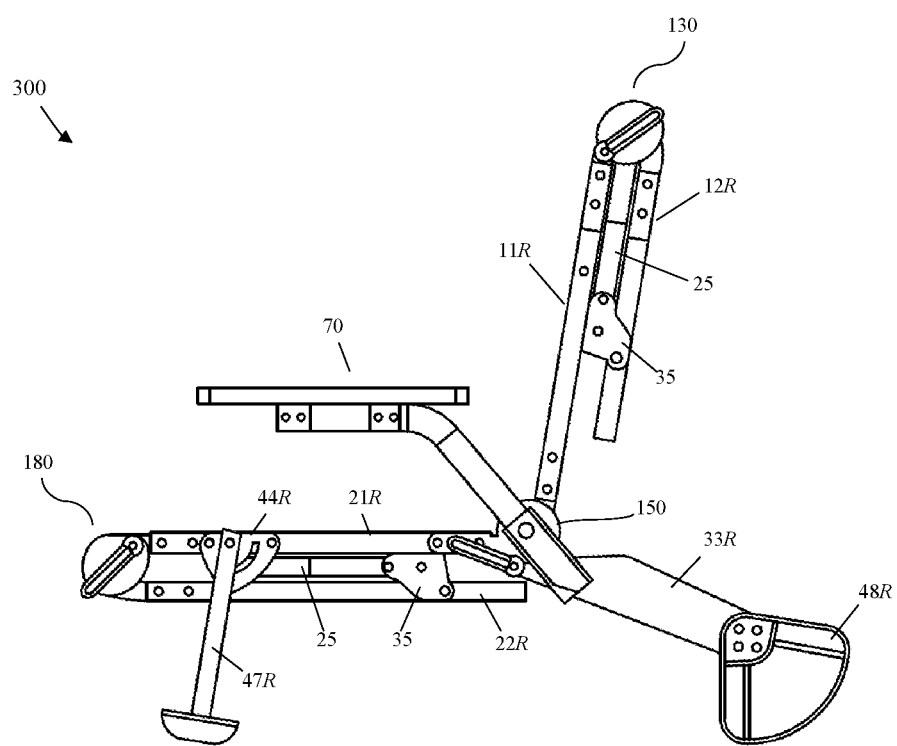
FIG. 15 is a perspective drawing of a beach chair assembly of a stackable folding chair apparatus according to an embodiment of the invention.

Similarly, the low beach chair assembly 300 of the multifunctional folding chair shown in FIG. 15 substantially corresponds to the low beach chair assembly 300 of the multifunctional wheeled chair apparatus shown in FIG. 8B. Therefore, shown in FIG. 15 is a multifunctional folding chair of the invention in a low beach chair configuration 300.

In embodiments, the low beach chair assembly 300 shown in FIG. 15 may be obtained by further folding of the assemblies 100 and 200 discussed above. That is, the substantially upright position of the back portion of the low beach chair assembly 300 has the same configuration and can be obtained in the same manner as in the reclining lounger assembly 200. In this configuration, however, the subframe 25 extending from the secondary frame assembly 20 is likewise folded around the second secondary frame member 22T by pivoting joints 35 onto an underside of the distal frame 20B of the secondary frame assembly 20 defined by distal secondary frame members 22R, 22L, and 22T. The distal secondary frame 20B defined by the distal secondary frame members 22R, 22L, 22T, having the subframe 25 folded to an underside thereof, is then also folded along the secondary hinge assembly 180 onto an underside of the proximal secondary frame 20B of the secondary frame assembly 20 defined by the proximal secondary frame members 21R and 22L. In the resulting configuration of the multifunctional chair of the invention, the primary frame assembly 10 functioning as the "back" is constituted essentially of the proximal primary frame 10A with the distal primary frame 10B and the subframe 25 folded onto themselves and under it, and the secondary frame assembly 20 functioning as the "base" disposed at approximately 90° from the back is constituted essentially of the proximal secondary frame 20A with the distal secondary frame 20B and the subframe 25 folded onto themselves and under it.

Figure 16:
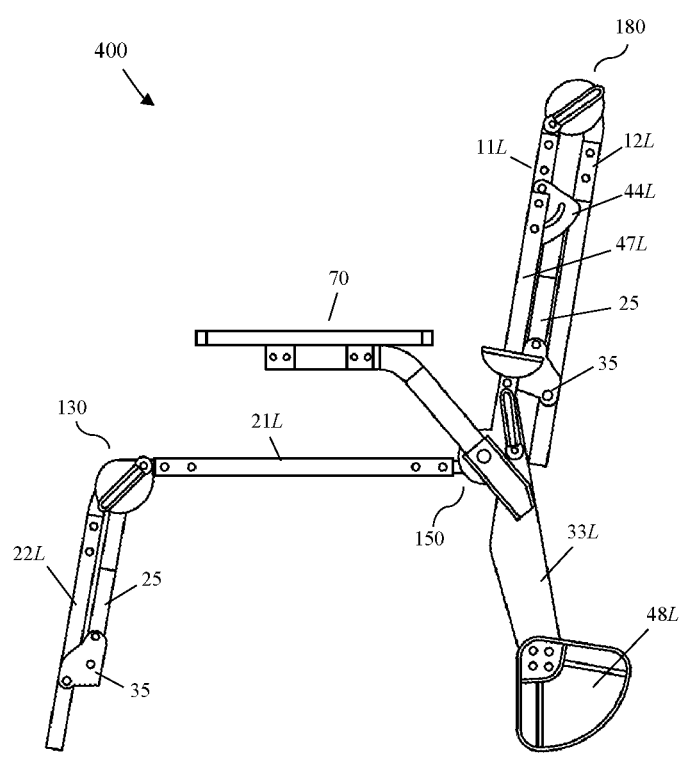
FIG. 16 is a perspective drawing of a regular chair assembly of a stackable folding chair apparatus according to an embodiment of the invention.

Shown in FIG. 16 is yet another configuration of the multifunctional folding chair of the invention. Specifically, depicted in FIG. 16 is a multifunctional chair of the invention in a regular chair configuration 400 that substantially corresponds to the regular chair configuration 400 of the multifunctional wheeled chair apparatus depicted in corresponding FIG. 9B.

In the regular chair configuration 400 of the multifunctional folding chair shown in FIG. 16, the primary frame assembly 10 serves as the "base" and the secondary frame assembly 20 serves as the "back." By reversing the orientation of the main frame assembly 1 as compared to the assemblies 200 and 300 discussed above (in which the primary frame assembly 10 functions as the "back" and the secondary frame assembly 20 functions as the "base"), the alignment of the stabilizers 48R and 48L is now substantially aligned as a downward extension of the "back" formed by the secondary frame assembly 20. Specifically, in the regular chair assembly 400, the subframe 25 extending form the primary frame assembly 10 is folded by the pivoting joints 35 around the distal primary frame member 12T (transverse frame member) onto an underside of the distal frame 10B of the primary frame assembly 10 formed by distal primary frame members 12R, 12L, and 12T. The distal primary frame 10B of the primary frame assembly 10 having the subframe 25 folded onto an underside thereof is subsequently also rotated downwards along the primary hinge assembly 130 such that an angle of about 100° is formed between an underside of the proximal frame and the distal frame with respect to the primary transverse rod 42. In the regular chair configuration 400, the secondary frame assembly 20 forms the "back" and is folded upwards around the central hinge assembly 150 such that the proximal secondary frame 20A is disposed at an angle of approximately 90° to the proximal primary frame 10A forming the "base." The subframe 25 extending from the secondary frame assembly 20 is folded by the pivoting joints 35 around the distal secondary frame member 22T (transverse frame member) onto an underside of the distal frame 20B of the secondary frame assembly 20 formed by distal secondary frame members 22R, 22L, and 22T. The distal secondary frame 20B having the subframe 25 folded onto an underside thereof is subsequently also rotated around and folded downward onto an underside of the proximal frame 20A of the secondary frame assembly 20.

The support legs 47R, 47L attached to opposing proximal secondary frame members 21R and 21L are folded via the respective pivoting joints 44R, 44L to be substantially parallel or laterally aligned with the proximal and distal secondary frame members 21R, 21L, 22R, 22L. Arm rests (handlebars) 70 may be connected to the proximal primary frame members 11R and 11L.

In a final configuration, the primary frame assembly 10, now essentially configured as the proximal frame 10A of the primary frame assembly 10 having the distal frame 10B of the primary frame assembly 10 with the folded subframe 25 folded onto an underside thereof, and the secondary frame assembly 20, now essentially configured as the proximal frame of the secondary frame assembly 20 having the distal frame of the secondary frame assembly 20 with the folded subframe 25 folded onto an underside thereof, are folded around the central hinge assembly 150 onto top surfaces of each other so as to be aligned in parallel. This results in the final folded configuration 600 of the multifunctional folding chair of the invention shown in FIG. 17, corresponding to the folded configuration 600 of the multifunctional wheeled chair apparatus shown in FIGS. 11A-11C.

In this final configuration of the multifunctional folding chair, the folded primary frame assembly 10 or the folded secondary frame assembly 20 can fold 180° around the central hinge assembly 150 onto the top surface of the opposite frame assembly, i.e., onto the top surface of the secondary frame assembly 20 or onto the top surface of the primary frame assembly 10, respectively. The support legs 47R and 47L, if in an extended position, are also folded so as to be aligned with the distal secondary frame members 22R and 22L, respectively.

Figure 17:
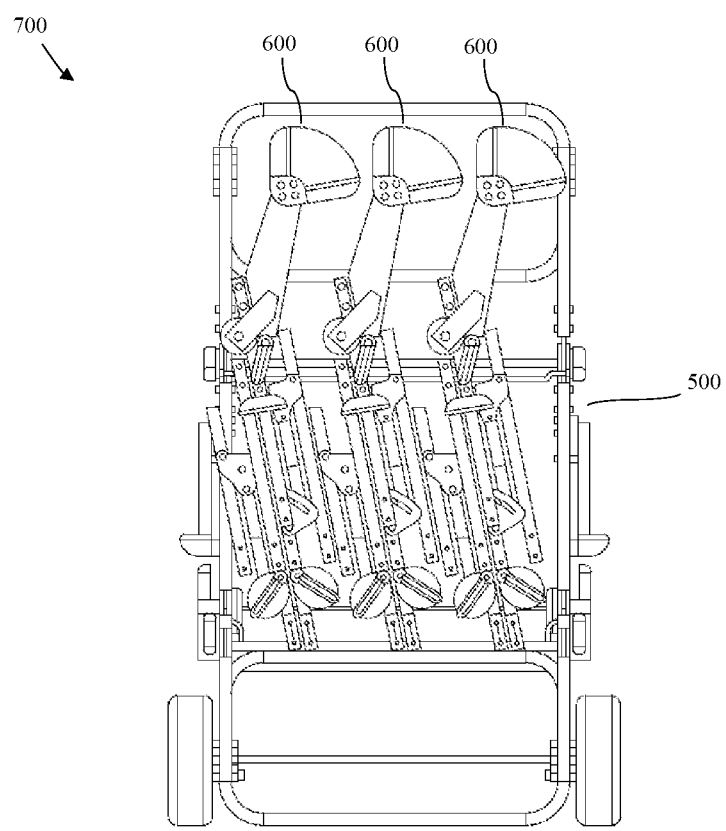
FIG. 17 shows a multifunctional wheeled chair apparatus in a wheeled carrier configuration loaded with stacked folding chairs according to an embodiment of the system of the invention.

As further shown in FIG. 17, by having stabilizers 48 in place of wheels according to the multifunctional wheeled chair apparatus of the invention, the multifunctional folding chair provides for more compact and light-weight storage (i.e., stacking alongside additional chairs) and transport. Specifically depicted in FIG. 17 is a system and kit 700 for transporting a plurality of multifunctional folding chairs in their respective folded configuration 600 with a multifunctional wheeled chair apparatus assembled into a rolling cart configuration 500.

In the rolling cart configuration 500 of the multifunctional wheeled chair apparatus, the primary frame assembly 10 serves as the "base" and the secondary frame assembly 20 serves as the "back." As shown in FIG. 10A, the subframe 25 extending form the primary frame assembly 10 is folded by the pivoting joints 35 around the distal primary frame member 12T (transverse frame member) onto an underside of the distal frame of the primary frame assembly 10 formed by distal primary frame members 12R, 12L, and 12T. The distal primary frame 10B having the subframe 25 folded onto an underside thereof is subsequently also rotated downwards along the primary hinge assembly 130 such that an angle of about 100° is formed between an underside of the proximal frame and the distal frame of the with respect to the primary transverse rod 42. The distal primary frame 10B comprised of the distal primary frame members 12R, 12L, and 12T forms the support for the multifunctional chair of the invention. The secondary frame assembly 20 forms a long "back" of the rolling cart assembly 500 and has an extended configuration in a vertical direction perpendicular to the "base." That is, the proximal frame 20A and the distal frame 20B of the secondary frame assembly 20 are rotatably coupled and substantially aligned at 180° to form an extended "back" section comprised of the proximal frame 20A and the distal frame 20B of the secondary frame assembly 20.

In certain embodiments of the rolling cart assembly of the multifunctional wheeled chair apparatus, the support legs 47R, 47L attached to opposing proximal secondary frame members 21R and 21L are folded via the respective pivoting joints 44R, 44L to be substantially parallel or laterally aligned with the proximal and distal secondary frame members 21R, 21L, 22R, 22L. The subframe 25 extending form the secondary frame assembly 20 may be folded downward in a direction of a user by the pivoting joints 35 around the distal secondary frame member 22T (transverse frame member). In certain embodiments, the subframe 35 may be fully folded against an underside of the distal secondary frame 20B formed by distal primary frame members 22R, 22L, and 22T. Alternatively, the subframe 25 may be only partly folded, or rotated downwardly around the joints 35 approximately 90° to form a handle attachment for a user of the rolling cart 500.

According to embodiments of the system of the invention, a multifunctional wheeled chair apparatus assembled to have a rolling cart configuration is configured to hold and transport things commonly packed or used during outdoor events, at the beach, while camping, etc. Additionally, the rolling cart is configured to hold a plurality of multifunctional folding chairs thereon and to facilitate transport of the chairs to the destination. In embodiments, the wheeled cart configuration may transport from 1 to 6 additional chairs in the folded configuration, preferably at least two, or between two and four additional chairs. While the additional chairs may be additional multifunctional wheeled chairs of the invention, with the wheels of the multifunctional wheeled chairs being optionally detachable for ease of stacking on the rolling cart assembly of another such chair, the one or more chairs stacked on the rolling cart is preferably a plurality of chairs, wherein the plurality is preferably of multifunctional folding chairs comprising stabilizers in place of the wheels. In preferred embodiments of the invention, one multifunctional wheeled chair apparatus is provided for a plurality of multifunctional folding chairs (up to the maximum of the plurality transportable by the rolling cart configuration) so as to provide the most cost-effective, compact, light-weight, and easily transportable system of the invention.

According to a further object of the invention, provided is a multifunctional folding and wheeling chair system. The system according to embodiments of the invention comprises: plurality of multifunctional folding chairs, wherein each of the plurality of multifunctional folding chairs comprises: an elongated main frame comprised of a plurality of rotatably connected frame members forming a primary frame assembly and a secondary frame assembly of substantially equal size within the substantially elongated main frame; a central hinge assembly rotatably coupled to the elongated main frame at a substantially central portion thereof and configured to selectively rotate the primary frame assembly and the secondary frame assembly between a first orientation and a second orientation, the central hinge assembly comprising: a first hinge and a second hinge coupled to opposite parallel sides of the elongated lateral frame and rotatably coupling frame members of the primary frame assembly and the secondary frame assembly; and a central transverse rod connected to the to the first hinge and the second hinge and defining a central folding portion of the main frame between the primary frame assembly and the secondary frame assembly; a stabilizer support assembly comprising: a pair of elongated arms pivotably coupled and extending laterally from opposite parallel sides of the main frame; a stabilizer rod transversely disposed between the pair of elongated arms in a direction perpendicular to a direction of elongation of the main frame; and a pair of stabilizers coupled to opposite ends of the stabilizer rod at exterior surfaces of the elongated arms; wherein the support assembly is configured to define a first height of a base portion of the multifunctional chair apparatus in configurations where the primary frame assembly and the secondary frame assembly have the first orientation, and to define a second height of the base portion of the multifunctional chair apparatus in configurations where the primary frame assembly and the secondary frame assembly have the second orientation, wherein in the first orientation, the primary frame assembly is configured as the base portion and the secondary frame assembly is configured as the back portion, and wherein in the second orientation, the primary frame assembly is configured as the back portion and the secondary frame assembly is configured as the base portion.

The aforementioned system according to embodiments of the invention further comprises: at least one multifunctional folding wheeled chair, wherein each of the plurality of multifunctional folding wheeled chairs comprises: an elongated main frame comprised of a plurality of rotatably connected frame members forming a primary frame assembly and a secondary frame assembly of substantially equal size within the substantially elongated main frame; a central hinge assembly rotatably coupled to the elongated main frame at a substantially central portion thereof and configured to selectively rotate the primary frame assembly and the secondary frame assembly between a first orientation and a second orientation, the central hinge assembly comprising: a first hinge and a second hinge coupled to opposite parallel sides of the elongated lateral frame and rotatably coupling frame members of the primary frame assembly and the secondary frame assembly; and a central transverse rod connected to the to the first hinge and the second hinge and defining a central folding portion of the main frame between the primary frame assembly and the secondary frame assembly; a wheel support assembly comprising: a pair of elongated arms pivotably coupled and extending laterally from opposite parallel sides of the main frame; a wheel axle rod transversely disposed between the pair of elongated arms in a direction perpendicular to a direction of elongation of the main frame; and a pair of wheels coupled to opposite ends of the wheel axle rod at exterior surfaces of the elongated arms; wherein the support assembly is configured to define a first height of a base portion of the multifunctional chair apparatus in configurations where the primary frame assembly and the secondary frame assembly have the first orientation, and to define a second height of the base portion of the multifunctional chair apparatus in configurations where the primary frame assembly and the secondary frame assembly have the second orientation, wherein in the first orientation, the primary frame assembly is configured as the base portion and the secondary frame assembly is configured as the back portion, and wherein in the second orientation, the primary frame assembly is configured as the back portion and the secondary frame assembly is configured as the base portion. In the system of the invention, the at least one multifunctional folding wheeled chair, in the wheeled cart configuration, is configured to hold the plurality of multifunctional folding chairs in the fully folded configurations. Specifically, the multifunctional folding wheeled chair in the wheeled cart configuration is configured to hold from 2 to 6 of the of the plurality of multifunctional folding chairs in the fully folded configuration. In certain embodiments, at least 3 or 3 of the multifunctional folding chairs in their fully folded configuration are suitably and conveniently stacked on the base portion of the multifunctional folding wheeled chair in the wheeled cart configuration.

Embodiments of invention prove for multifunctional chairs comprising a wheel support assembly together with multifunctional chairs comprising a stabilizer support assembly. Each of the multifunctional folding wheeled chairs has: an unfolded configuration of a flat bed; a partially folded configuration of a reclined lounger, an upright lounger, a short beach chair, an upright chair, and a wheeled cart; and a fully folded configuration. Each of the multifunctional folding chairs have: an unfolded configuration of a flat bed; a partially folded configuration of a reclined lounger, an upright lounger, a short beach chair, and an upright chair; and a fully folded configuration.

According to yet another object of the invention, provided is a multifunctional chair and wheeled cart kit. A kit according to embodiments of the invention comprises: a plurality of multifunctional folding chairs, each of the plurality of multifunctional folding chairs comprising: an elongated main frame comprised of a plurality of rotatably connected frame members forming a primary frame assembly and a secondary frame assembly of substantially equal size within the elongated main frame; a central hinge assembly rotatably coupled to the elongated main frame at a substantially central portion thereof and configured to selectively rotate the primary frame assembly and the secondary frame assembly between a first orientation and a second orientation, the central hinge assembly comprising: a first hinge and a second hinge coupled to opposite parallel sides of the elongated lateral frame and rotatably coupling frame members of the primary frame assembly and the secondary frame assembly; and a central transverse rod connected to the to the first hinge and the second hinge and defining a central folding portion of the main frame between the primary frame assembly and the secondary frame assembly; a support assembly comprising a pair of elongated arms pivotably coupled and extending laterally from opposite parallel sides of the main frame, the support assembly being configured to define a first height of a base portion of the multifunctional chair apparatus in configurations where the primary frame assembly and the secondary frame assembly have the first orientation, and to define a second height of the base portion of the multifunctional chair apparatus in configurations where the primary frame assembly and the secondary frame assembly have the second orientation, wherein in the first orientation, the primary frame assembly is configured as the base portion and the secondary frame assembly is configured as the back portion, and wherein in the second orientation, the primary frame assembly is configured as the back portion and the secondary frame assembly is configured as the base portion; and at least one of the plurality of multifunctional being a wheeled chair, wherein the at least one wheeled chairs further comprises, as part of the support assembly, a pair of wheels attached at opposite ends of a transverse wheel axle rod, and wherein the at least one wheeled chair is foldable into a configuration of a wheeled cart, the wheeled cart being configured to hold the plurality of multifunctional chairs in fully folded configurations. According to embodiments, the plurality of multifunctional chairs comprise, as part of the support assembly, a pair of stabilizers attached at opposite ends of a transverse stabilizer rod, wherein the stabilizers have a shape of a circular vector with a rounded side forming the bottom base portion. In preferred embodiments, at least one of the plurality of multifunctional chairs that is a wheeled chair has a wheeled cart configuration, the wheeled art configuration being configured for holding and transporting from 2 to 5 of the plurality of multifunctional chairs, and the plurality of multifunctional chairs comprising the stabilizers so as to have a more compact fully folded configuration.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:
1. A multifunctional chair apparatus comprising:
a first frame assembly comprising a first pair of parallel frame members and a first horizontal frame member extending between the first pair of parallel frame members;
a second frame assembly comprising a second pair of parallel frame members and a second horizontal frame member extending between the second pair of parallel frame members;

a hinge assembly being configured to rotatably engage from a closed position to an open position, the first pair of parallel frame members being coupled to a first end of the hinge assembly and the second pair of parallel frame members being coupled to a second end of the hinge assembly, the first frame assembly and the second frame assembly being rotatably coupled along an axis to define a first orientation and a second orientation, wherein the first orientation defines the first frame assembly as a chair seat and the second frame assembly as a chair back, and the second orientation defines the first frame assembly as the chair back and the second frame assembly as the chair seat;

a first support rotatably coupled to the first frame assembly, configured to hold the first frame assembly spaced apart from the ground in the first orientation and a second support rotatably coupled to the second frame assembly, configured to hold the second frame assembly spaced apart from the ground in the second orientation; and, a support assembly comprising a first elongated arm and a second elongated arm and a pair of stabilizers, wherein a first stabilizer in the pair of stabilizers is coupled to a distal end of the first elongated arm and a second stabilizer in the pair of stabilizers is coupled to a distal end of the second elongated arm, the first elongated arm and the second elongated arm being coupled to the first frame assembly and extending from the first pair of parallel frame members such that the support assembly is configured to provide load support to the first frame assembly in the first orientation and provide load support to the second frame assembly in the second orientation.

2. The multifunctional chair apparatus of claim 1 further comprising a third frame assembly comprising a third pair of parallel frame members and a third horizontal frame member extending between the third pair of parallel frame members, the third frame assembly being rotatably coupled to the first frame assembly.

3. The multifunctional chair apparatus of claim 2 further comprising a fourth frame assembly comprising a fourth pair of parallel frame members and a fourth horizontal frame member extending between the fourth pair of parallel frame members, the fourth frame assembly being rotatably coupled to the second frame assembly.

4. The multifunctional chair apparatus of claim 2 further comprising a second hinge assembly being coupled to the first frame portion and the third frame portion.

5. The multifunctional chair apparatus of claim 4 further comprising a third hinge assembly being coupled to the second frame assembly and the fourth frame assembly.

6. The multifunctional chair apparatus of claim 1 wherein the hinge assembly is configured to be selectively locked at angles of about 0 degrees, about 100 degrees, about 140 degrees, and about 180 degrees.

7. The multifunctional chair apparatus of claim 1 further comprising a pair of arm rests being removably coupled to the first frame assembly in the first orientation and being removably coupled to the second frame assembly in the second orientation.

8. The multifunctional chair apparatus of claim 1 wherein the support assembly defines a first seat height in the first orientation and a second seat height in the second orientation.

9. A multifunctional chair system comprising:
a first chair comprising:

a frame assembly comprising a first frame portion and a second frame portion;

a wheel assembly being coupled to the frame assembly, the wheel assembly comprising a pair of elongated support arms and a pair of wheels, the wheel assembly being configured to define a first seat height of the frame assembly when configured in a first configuration and define a second seat height of the frame assembly when configured in a second configuration;

a first support rotatably coupled to the first frame portion, configured to hold the first frame portion spaced apart from the ground in the first orientation and a second support rotatably coupled to the second frame portion, configured to hold the second frame portion spaced apart from the ground in the second orientation;

a hinge assembly comprising at least one lockable hinge, the hinge assembly being coupled to the frame assembly and being configured to selectively position the first frame portion and the second frame portion between a folded position, a seated position, a reclined position, and a flat position; and a second chair being configured between a folded configuration and a seated configuration, the second chair being removably coupled to the frame assembly of the first chair when in the folded configuration.

10. The multifunctional chair system of claim 9 wherein the first frame portion, the second frame portion, and the wheel assembly are selectively configured to define a cart.

11. The multifunctional chair system of claim 10 wherein the second chair is removably coupled to the frame assembly of the first chair when the first chair is configured to define the cart.

12. The multifunctional chair system of claim 9 wherein the second chair comprises a support assembly comprising a first elongated arm and a second elongated arm and a pair of stabilizers, wherein a first stabilizer in the pair of stabilizers is coupled to a distal end of the first elongated arm and a second stabilizer in the pair of stabilizers is coupled to a distal end of the second elongated arm.

13. The multifunctional chair system of claim 9 wherein the second frame portion comprises a first frame section and a second frame section being pivotably coupled by a first hinge and a second hinge.

14. A multifunctional chair kit comprising:
a first chair comprising:

a frame assembly comprising a first frame portion and a second frame portion;

a wheel assembly being coupled to the frame assembly, the wheel assembly comprising a pair of elongated support arms and a pair of wheels, the wheel assembly being configured to define a first seat height of the frame assembly when configured in a first configuration and define a second seat height of the frame assembly when configured in a second configuration;

a first support rotatably coupled to the first frame portion, configured to hold the first frame portion spaced apart from the ground in the first orientation and a second support rotatably coupled to the second frame portion, configured to hold the second frame portion spaced apart from the ground in the second orientation;

a hinge assembly comprising at least one lockable hinge, the hinge assembly being coupled to the frame assembly and being configured to selectively position the first frame portion and the second frame portion between a folded position, a seated position, a reclined position, and a flat position; and,
a second chair comprising:
   a frame assembly comprising a first frame portion and a second frame portion;
   a support assembly being coupled to the frame assembly, the support assembly comprising a first elongated arm and a second elongated arm and a pair of stabilizers, wherein a first stabilizer in the pair of stabilizers is coupled to a distal end of the first elongated arm and a second stabilizer in the pair of stabilizers is coupled to a distal end of the second elongated arm, the support assembly being configured to define a first seat height of the frame assembly when configured in a first configuration and define a second seat height of the frame assembly when configured in a second configuration;
a first support rotatably coupled to the first frame portion, configured to hold the first frame portion spaced apart from the ground in the first orientation and a second support rotatably coupled to the second frame portion, configured to hold the second frame portion spaced apart from the ground in the second orientation;
   a hinge assembly comprising at least one lockable hinge, the hinge assembly being coupled to the frame assembly and being configured to selectively position the first frame portion and the second frame portion between a folded position, a seated position, a reclined position, and a flat position.

15. The multifunctional chair kit of claim 14 wherein the second chair is removably coupled to the frame assembly of the first chair.

16. The multifunctional chair kit of claim 15 wherein the first chair is selectively configured as a cart.

17. The multifunctional chair kit of claim 14 wherein the first chair further comprises a pair of arm rests being removably coupled to the first frame portion in the first orientation and being removably coupled to the second frame portion in the second orientation.

18. The multifunctional chair kit of claim 14 wherein the at least one lockable hinge of the first chair and the second chair is configured to selectively lock at angles of about 0 degrees, about 100 degrees, about 140 degrees, and about 180 degrees.

* * * * *